United States Patent
Buchanan

(10) Patent No.: US 12,129,827 B2
(45) Date of Patent: Oct. 29, 2024

(54) VERTICAL AXIS WIND TURBINE

(71) Applicant: Shannon R. Buchanan, Mechanicsburg, OH (US)

(72) Inventor: Shannon R. Buchanan, Mechanicsburg, OH (US)

(*) Notice: Subject to any disclaimer, the term of this patent is extended or adjusted under 35 U.S.C. 154(b) by 6 days.

(21) Appl. No.: 18/150,725

(22) Filed: Jan. 5, 2023

(65) Prior Publication Data
US 2023/0160364 A1    May 25, 2023

Related U.S. Application Data

(63) Continuation-in-part of application No. 16/559,364, filed on Sep. 3, 2019, now abandoned.

(51) Int. Cl.
*F03D 3/06*    (2006.01)
*F03D 3/00*    (2006.01)
*F03D 80/70*   (2016.01)

(52) U.S. Cl.
CPC ............ *F03D 3/068* (2013.01); *F03D 3/005* (2013.01); *F03D 80/70* (2016.05); *F05B 2220/706* (2013.01); *F05B 2240/214* (2013.01); *F05B 2260/72* (2013.01); *F05B 2260/78* (2013.01); *F05B 2260/902* (2013.01)

(58) Field of Classification Search
CPC .......... F03D 3/068; F03D 80/70; F03D 3/005; F05B 2220/706; F05B 2240/214; F05B 2260/72; F05B 2260/78; F05B 2260/902
See application file for complete search history.

(56) References Cited

U.S. PATENT DOCUMENTS

2017/0051720 A1 * 2/2017 Grigg ................. F03D 3/005

* cited by examiner

*Primary Examiner* — Viet P Nguyen
(74) *Attorney, Agent, or Firm* — MIP Legal, Ltd.; Bryce D. Miracle, Esq.

(57) ABSTRACT

The vertical wind turbine and system generally comprises a rotor assembly having a plurality of blades, a fixed central spindle having a central axis for supporting rotation of the rotor assembly, a blade adjustment mechanism assembly for adjusting the blade angle of attack throughout rotation of the rotor assembly, and a support framework for supporting the rotor assembly at an elevated position to gain access to a sustained source of wind. The wind turbine may be operably coupled with a power electric generator or other device that transfers mechanical energy into electrical energy as a combined system.

17 Claims, 29 Drawing Sheets

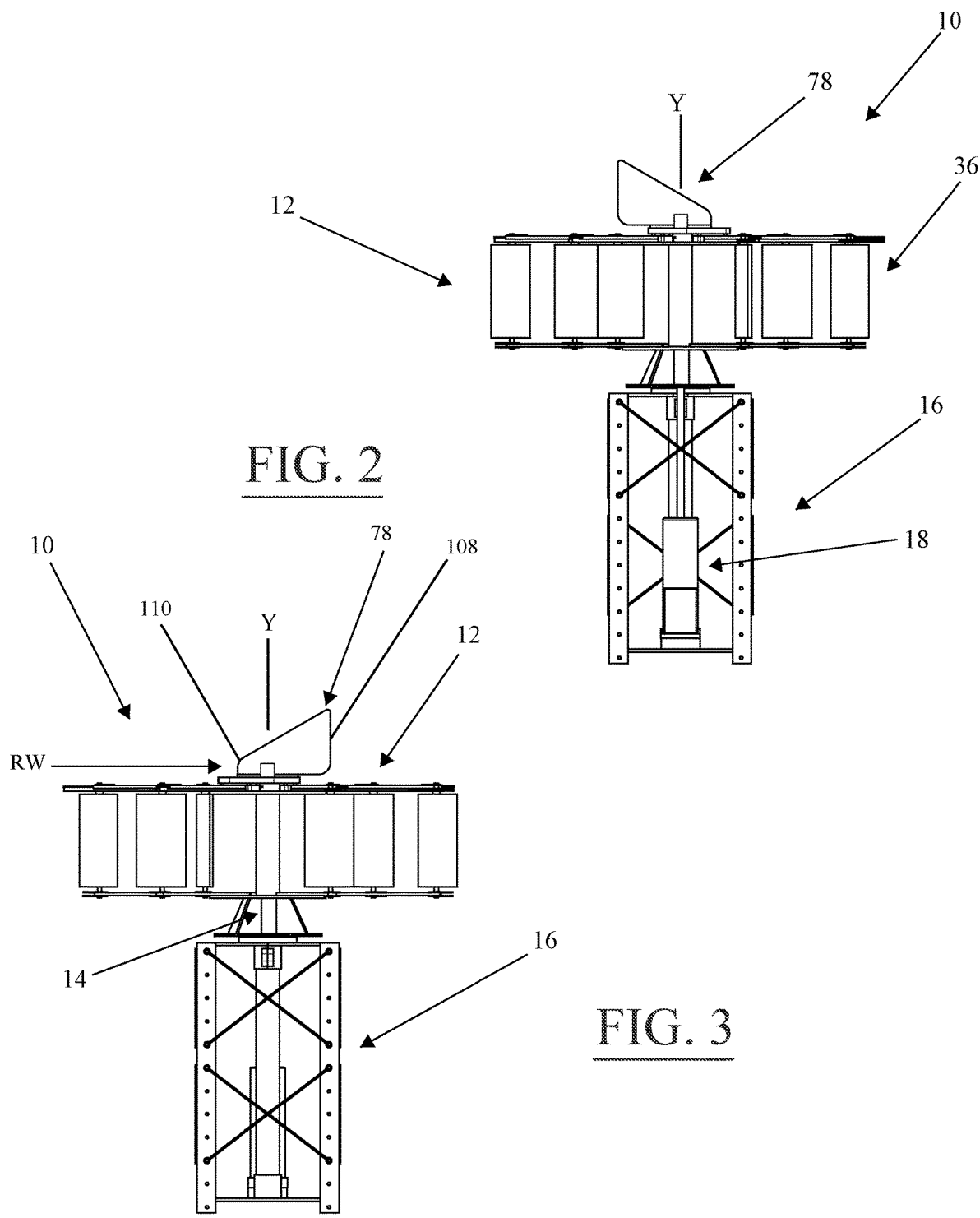

Detail "A"

Detail "B"

Section View A-A

Detail "C"

SECTION A-A

SECTION B-B

Detail "C"

Detail "D"

VERTICAL AXIS WIND TURBINE

CROSS-REFERENCE TO RELATED APPLICATIONS

This application is a continuation-in-part of and is based upon and claims the priority filing date of the previously filed, co-pending U.S. Nonprovisional patent application entitled "Vertical Axis Wind Turbine," filed Sep. 3, 2019, Ser. No. 16/559,364, the entire disclosure of which is hereby incorporated herein by reference.

FIELD OF THE INVENTION

The present invention relates to the field of wind turbines, specifically to vertical axis wind turbine and methods of operating them.

BACKGROUND

Wind energy is a fast-growing renewable resource that will play a factor in reducing the world's reliance on fossil fuels. The wind industry is growing on a global and national level. The United States Department of Energy (DOE) aims for 20% of the nation's electricity to be produced from wind by 2030. The DOE also states that "greater use of the nation's abundant wind resources for electric power generation will help the nation reduce emissions of greenhouse gases and other air pollutants, diversify its energy supply, provide cost-competitive electricity to key regions across the country, and reduce water usage for power generation." Wind energy is a fast-growing renewable resource that will play a factor in reducing the world's reliance on fossil fuels.

Generally speaking, wind turbines are used to convert the kinetic energy of the wind to power by use of turbine blades rotatably arranged on a drive shaft. The wind exerts a force on the turbine blades, which by rotation of the turbine blades is transformed to a torque about the longitudinal axis of the drive shaft driving the drive shaft. The rotating drive shaft is connected to a generator to produce electrical power or any other form of power medium.

Numerous designs of wind turbines have been presented. Generally, these designs fall into two categories, i.e., horizontal axis wind turbines or vertical axis wind turbines. Most common are horizontal axis wind turbines, wherein the turbine blades are arranged in a propeller-like manner about the longitudinal axis of the horizontal drive shaft, forming a rotor that is placed at the top of a tower structure. The rotor has to be pointed in the direction of the wind. Usually, the generator and/or a gearbox, which converts the rotation speed of the blades to a rotation speed more convenient for power generation, are placed at the top of the tower. Vertical axis wind turbines have turbine blades arranged in a carousel manner about the longitudinal axis of the drive shaft, which is directed perpendicular to the direction of the wind. Usually, the drive shaft is vertical, although the drive shaft also can be placed horizontally.

Moreover, the horizontal axis wind turbine has the highest coefficient of performance currently available and operates by producing lift. Lift is a force that is perpendicular to the fluid motion on the airfoil. In order for the turbine blade to rotate faster, the wind lift force must exceed the drag force. The drag force is parallel to the relative velocity and is present throughout the whole circle of rotation. Lift force, however, is only present when there is a low-pressure zone on one side of the airfoil. This means that there are zones in a full revolution where no lift is produced.

The main issue with horizontal wind turbines are the cost and the fact that the power generator and other electrical equipment are generally located at the top of a tower. This makes maintenance difficult, so the operation and maintenance costs of new turbines are 20-25% of the annual profit. Turbine maintenance can take 1 to 7 days of downtime for each repair depending on the part that needs to be replaced. In addition to downtime required for maintenance, the structure that supports the turbine needs to be sturdy enough to hold up the heavy generator equipment as well. For example, a structure of a small turbine that is only eighty feet tall accounts for approximately 30 percent of the total system cost.

For the foregoing reasons, there is a need for a wind-powered turbine that can be maintained at a low cost while producing more power than a traditional horizontal wind turbine which provides superior airflow and lift characteristics.

SUMMARY

In accordance with the invention, a vertical axis wind turbine is provided that efficiently powers a generator to provide electricity, particularly electricity to be supplied to a power grid for conducting electrical energy or for storage in high-capacity batteries for future use thereof. The vertical axis wind turbine comprises a blade angle adjustment mechanism that precisely and simultaneously adjusts the angle of attack of each of the plurality of blades through a cyclical path of rotation based on the relative wind direction as observed by a wind vane assembly. The angle of attack of each blade throughout the cyclical path of rotation is configured to provide the maximum amount of lift.

In certain versions of the application, the wind vane assembly may further comprise a brake release assembly for rotationally locking the wind vane assembly while wind velocity and direction remain unchanged. The brake release assembly is configured to unlock the wind vane assembly, allowing it to rotate when changes in wind velocity and direction reach a certain threshold, thereby allowing the wind vane assembly to move and relock into a new position based on the currently observed relative wind direction.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where:

FIG. 2 is a front elevation view of the version shown in FIG. 1;

FIG. 3 is a rear elevation view of the version shown in FIG. 1;

DETAILED DESCRIPTION

Figure 1:
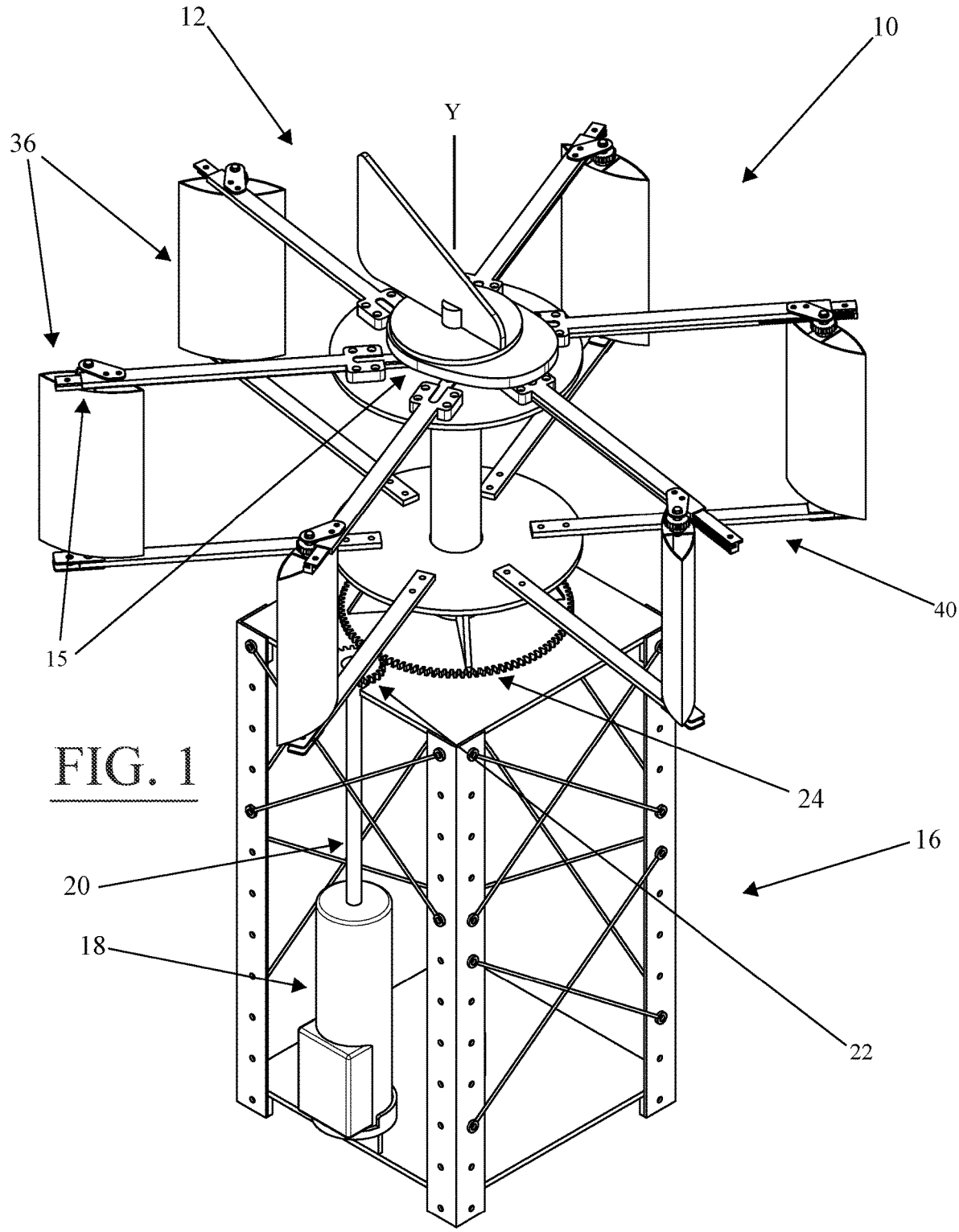
FIG. 1 is a front perspective view of a version of the vertical axis wind turbine.
Figure 4:
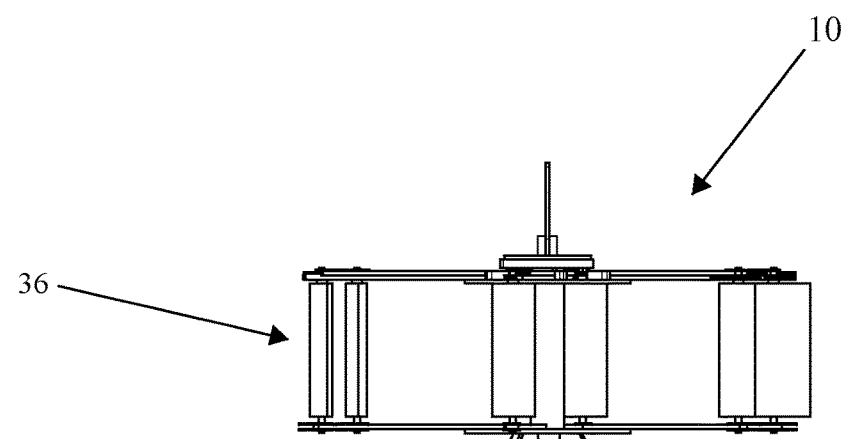
FIG. 4 is a left-side elevation view of the version shown in FIG. 1.

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other versions that depart from these specific details. In other instances, detailed descriptions of well-known devices and methods are omitted so as not to obscure the description of the present invention with unnecessary detail.

The following detailed description is of the best currently contemplated modes of carrying out exemplary versions of the invention. The description is not to be taken in the limiting sense, but is made merely for the purpose illustrating the general principles of the invention, since the scope of the invention is best defined by the appended claims. Various inventive features are described below that can each be used independently of one another or in combination with other features.

Referring now to the figures wherein the showings are for purposes of illustrating a preferred version of the invention only and not for purposes of limiting the same, the present application discloses a vertical axis wind turbine that efficiently powers a generator for providing electricity, particularly electric to be supplied to a power grid for conducting electrical energy or for storage in high capacity batteries for future use thereof.

Referring generally to FIG. 1— FIG. 6, in a version of the application the wind turbine 10 and system generally comprises a rotor assembly 12 having a plurality of blades 36, a fixed central spindle 14 having a central axis Y for supporting rotation of the rotor assembly 12, a blade angle adjustment mechanism 15 for adjusting the blade angle of attack throughout rotation of the rotor assembly 12, and a support framework 16 for supporting the rotor assembly 12 at an elevated position to gain access to a sustained source of wind. The wind turbine 10 may be operably coupled with a power electric generator 18 or other device that transfers mechanical energy into electrical energy as a combined system.

Generally speaking, the blade angle adjustment mechanism 15 is a fully mechanically and autonomously driven and is configured to change the blade rotating angle or relating angle of attack of each blade 36 at each point through the relative circular motion of the turbine 10 depending on wind direction. In other terms, each of the blades 36 is responsive to rotation throughout the cyclical path of the rotor assembly 12 to vary the blade angle of attack with respect to the direction of the wind impinging on the rotor assembly 12, without the need of motors, such as a stepper motor. Preferably, each blade 36 angle of attack changes relative to the instant relative wind direction RW (FIG. 3) and is operably configured to provide the maximum instantaneous rotational force applied about the central axis Y, causing the rotor assembly to move throughout a cyclical path of motion.

In the illustrated version, the electric generator 18 is ideally positioned below the rotor assembly 12 within the support framework 16 in an upright disposition (See FIG. 1 and FIG. 9). The electric generator 18 can be of any type that converts rotational mechanical energy generated from the wind turbine 10 into electrical energy. For example, a parallel shaft direct current DC gearmotor may be utilized in conjunction with a drive shaft 20 having one or more gears 22 that operate to transfer power from the rotation of the rotor assembly 12 to the drive shaft 20 of the electric generator 18.

With reference to FIG. 9-FIG. 12, the support framework 16 can be constructed in any manner that operably and safely supports the rotor assembly 12 and fixed central spindle 14 among other parts, in a vertical operating position. Ideally, the height of the support framework 16 is sufficiently elevated to position the rotor assembly 12 such that it is subjected to a sustained airflow. For example, the support framework 16 may ideally position the rotor assembly 12 a few feet above the respective ground or thousands of feet in the atmosphere in order to gain access to sustained, high-velocity winds.

Figure 18:
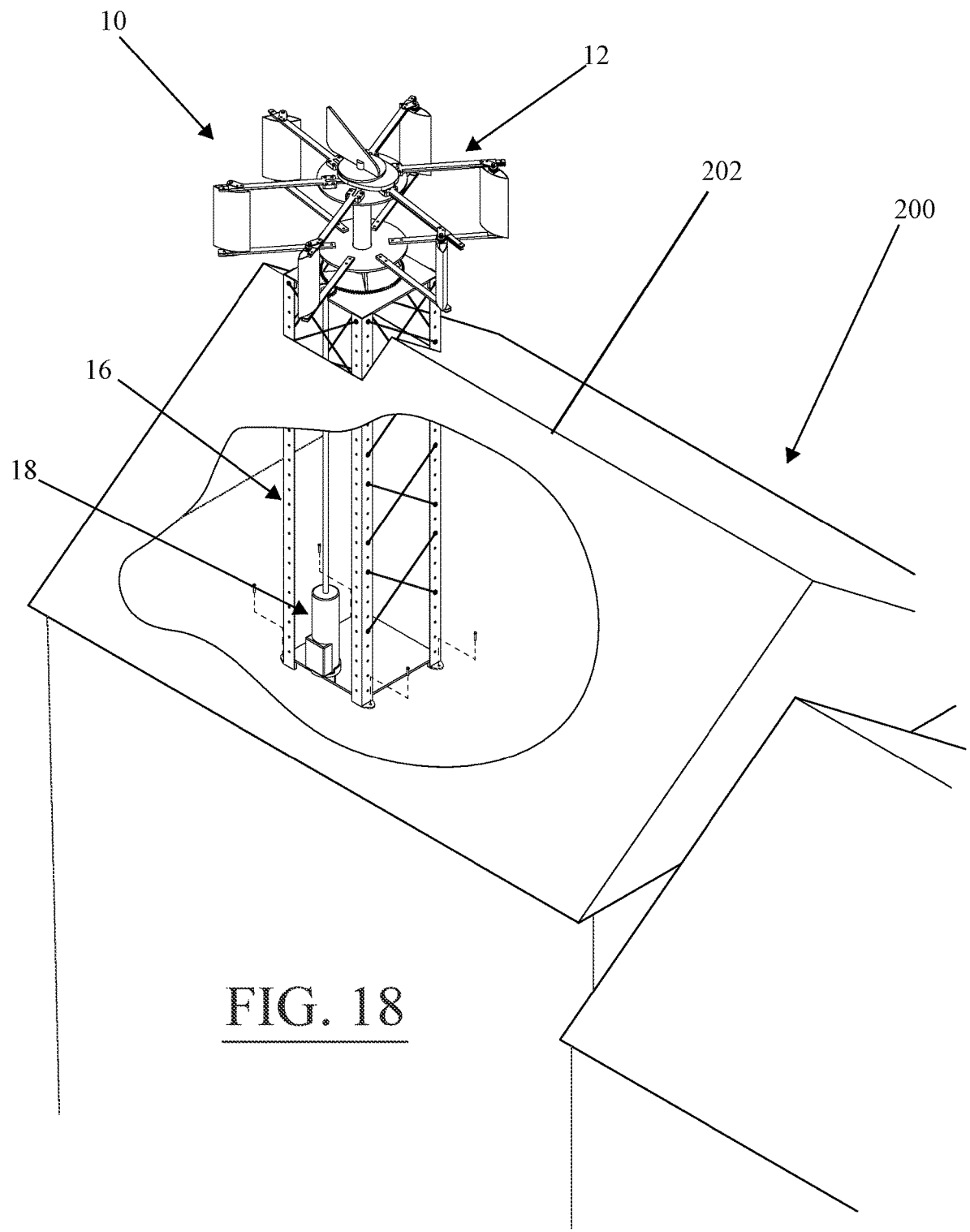
FIG. 18 is an illustrative example of a version of the vertical axis wind turbine operably coupled to a housing structure.

Other variations may be tailored to position the rotor assembly 12 above the roof line of housing or other man-made structures. FIG. 18 illustrates an example support framework 16 that is operably coupled with a home structure 200 roof 202, which places the rotor assembly 12 above the roof line of the home 200 and is operably configured to provide electrical energy for the illustrated home 200 or building structure provided by the electric generator 18.

Figure 9:
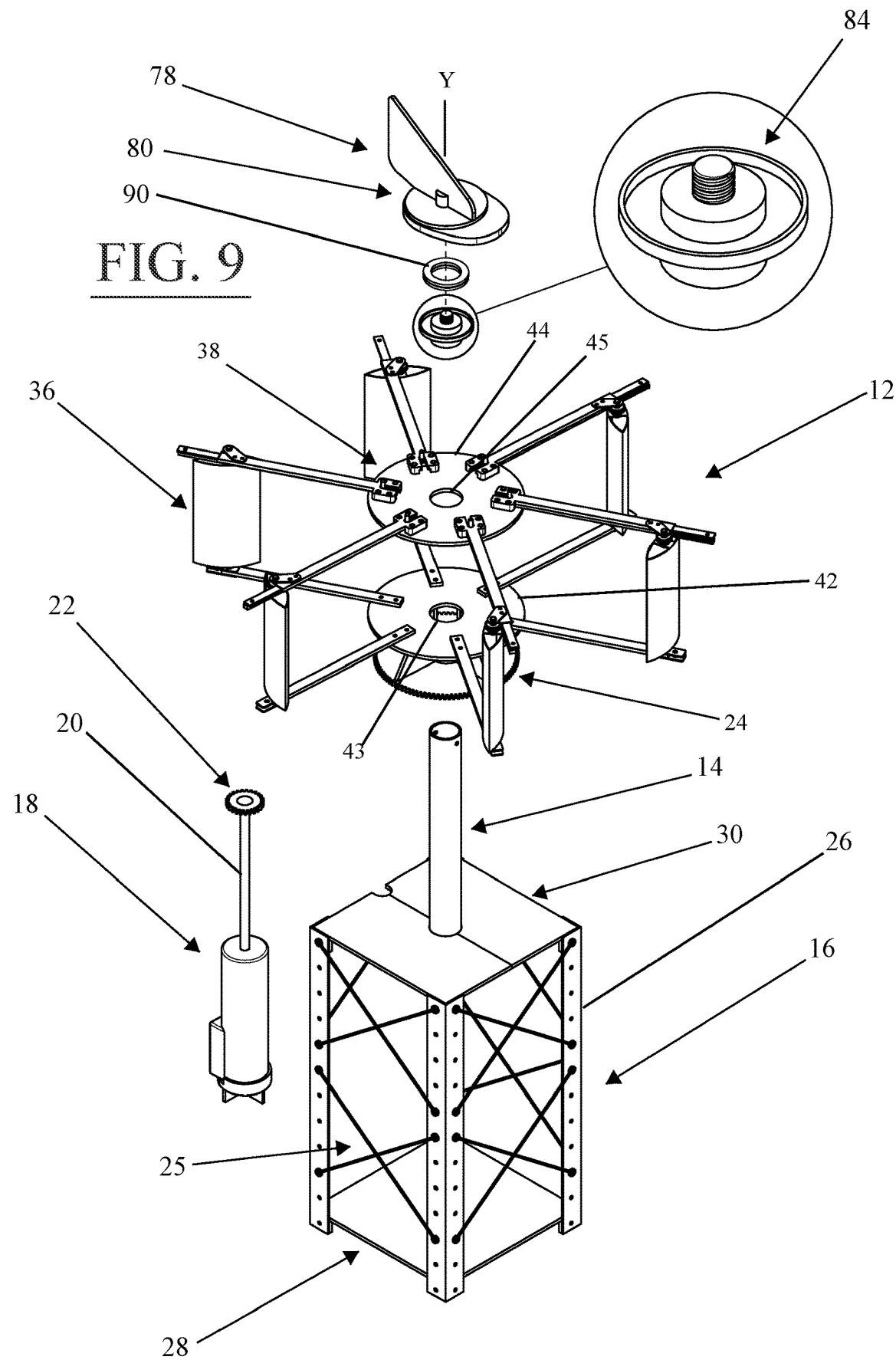
FIG. 9 is an exploded perspective view of the version shown in FIG. 1.

Ideally, the support framework 16 is constructed of a combination of woven cables 25 and angle iron 26 that form a rectangular frame having a low coefficient of drag, thereby allowing airflow efficiently pass through the structure (See FIG. 9). In the version, the support framework 16 includes a base platform 28 and an elevated platform 30 positioned there above. The base platform 28 provides support for the electrical generator 18. Preferably, the generator 18 is positioned a sufficient distance from the rotor assembly 12 and other moving parts—mitigating the likelihood of a collision occurring between moving parts and the generator 18 and providing sufficient area for the generator 18 to dissipate heat during operation.

Figure 11:
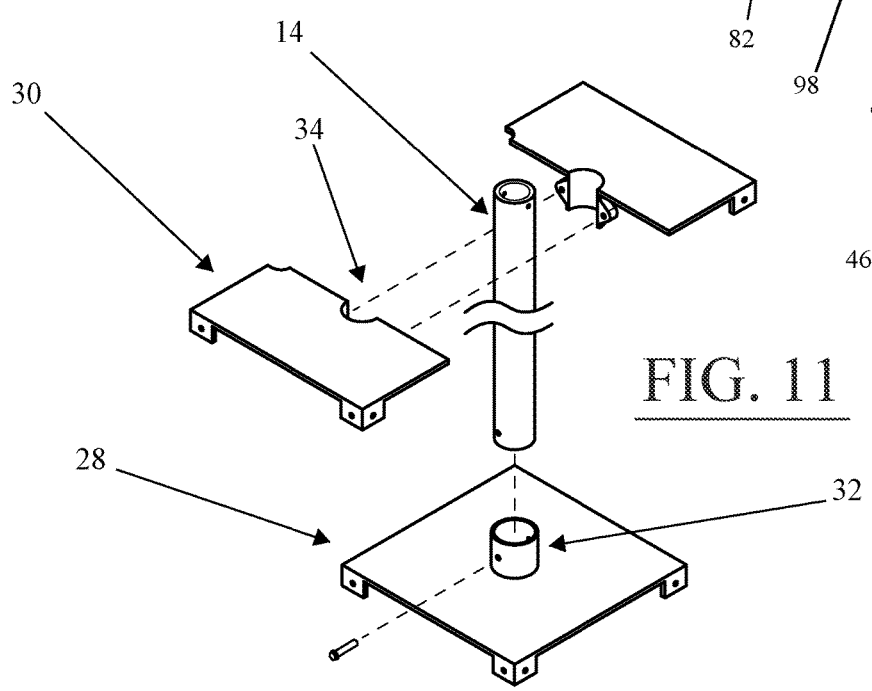
FIG. 11 is an unassembled view of the of the support framework of the version shown in FIG. 1.
Figure 12:
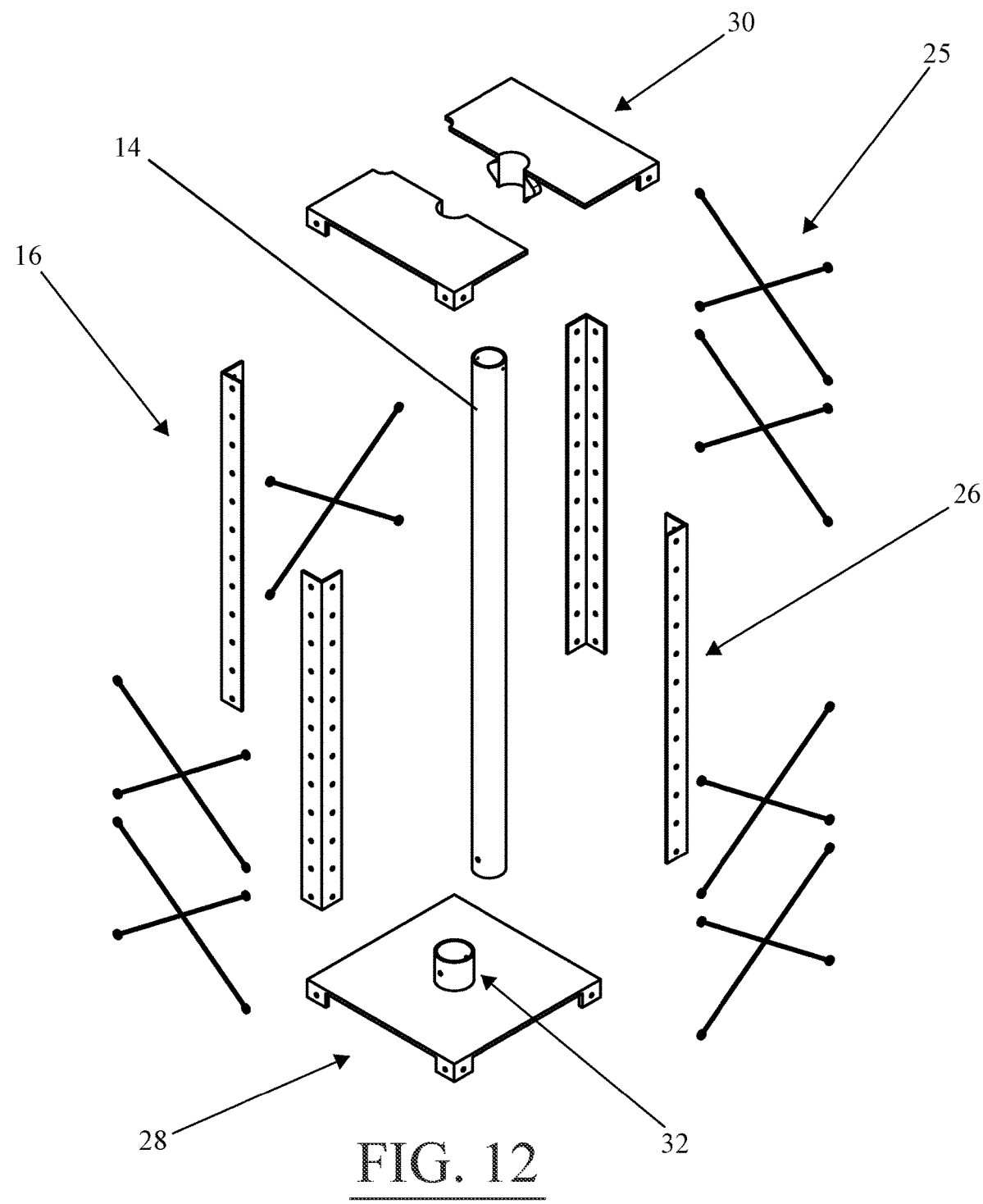
FIG. 12 is an unassembled view of the support framework and fixed central spindle of the version shown in FIG. 1.

As best illustrated in FIG. 11, the base platform 28 further provides a seating coupler 32 for receiving and positioning the fixed central spindle 14 in a vertical direction. Moreover, the elevated platform 30 provides a cylindrical hole 34 that allows and contains the fixed central spindle 14 for passing vertically therethrough.

Now referring to the figures, particularly FIG. 1, the rotor assembly 12 is constructed to freely rotate about the fixed central spindle 14 and central axis Y through a cylindrical path of rotation. The rotor assembly 12 generally comprises a plurality of blades 36 or airfoils that create lift, thereby imparting motion to the rotor assembly 12 and, in turn, provides motive force to the drive shaft 20 of the electric generator 18.

Figure 6:
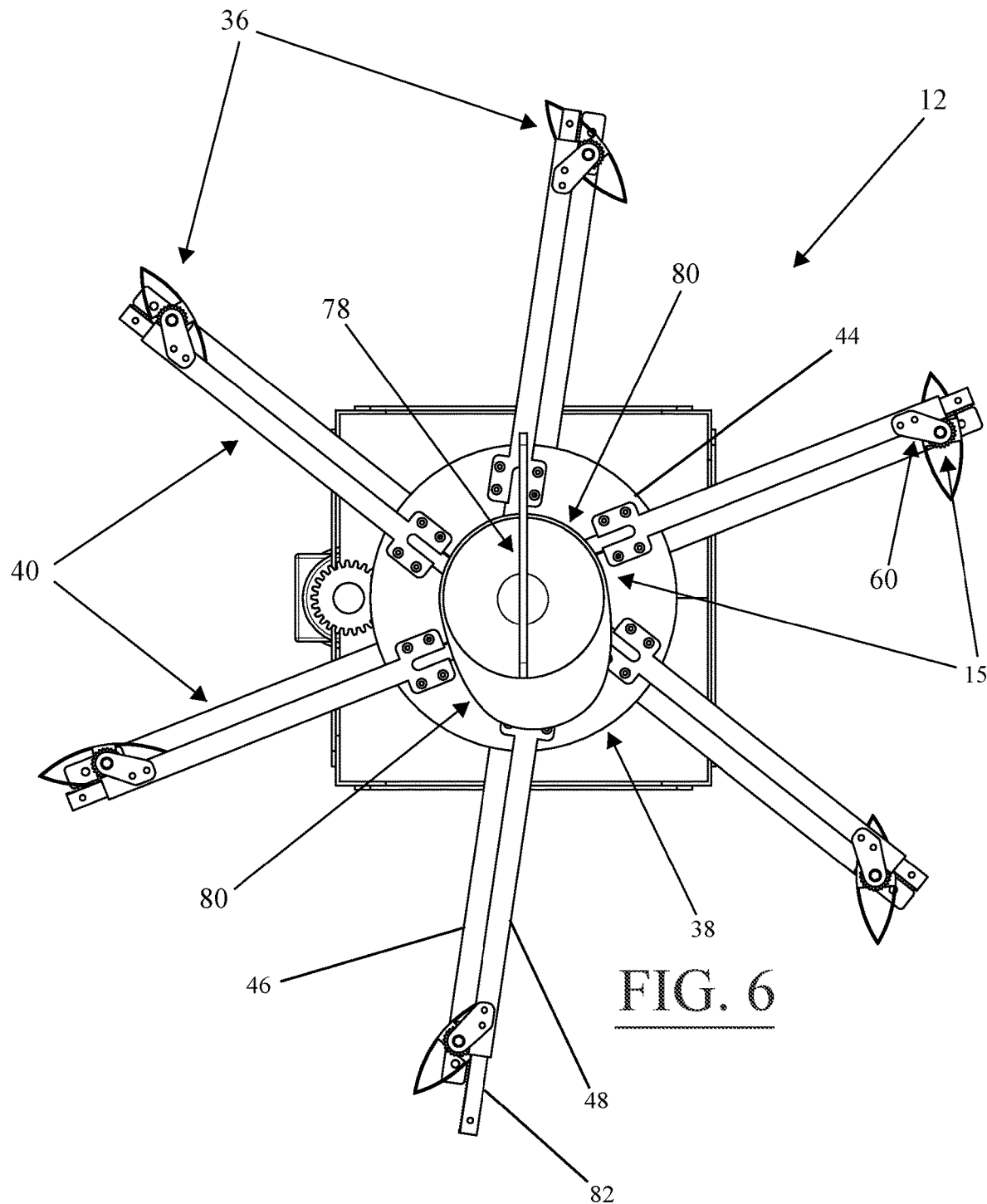
FIG. 6 is a top plan view of the version shown in FIG. 1.
Figure 7:
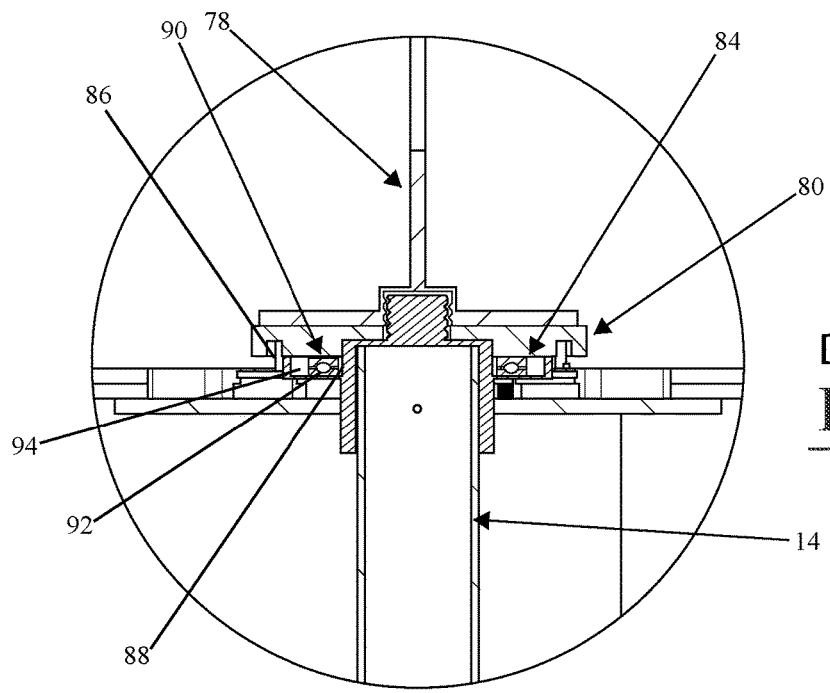
FIG. 7 is an up-close cross-sectional view taken at Detail "A" in FIG. 5 of the version shown in FIG. 1.

As best illustrated by FIG. 6 and FIG. 9, the rotor assembly 12 is generally configured in a hub and spoke formation—each blade 36 positioned radially from the hub assembly 38 by way of respective arm assemblies 40. In the illustrated version, the hub assembly 38 comprises a lower hub 42 and an upper hub 44. Each hub 42, 44 is shaped in the form of a circular platform including axially aligned holes 43, 45 for receipt of the fixed central spindle 14 resembling the shape of a washer. The hub assembly 38 generally provides radial structural support platform for each arm assemblies 40 to attach with by way of hardware.

Figure 10:
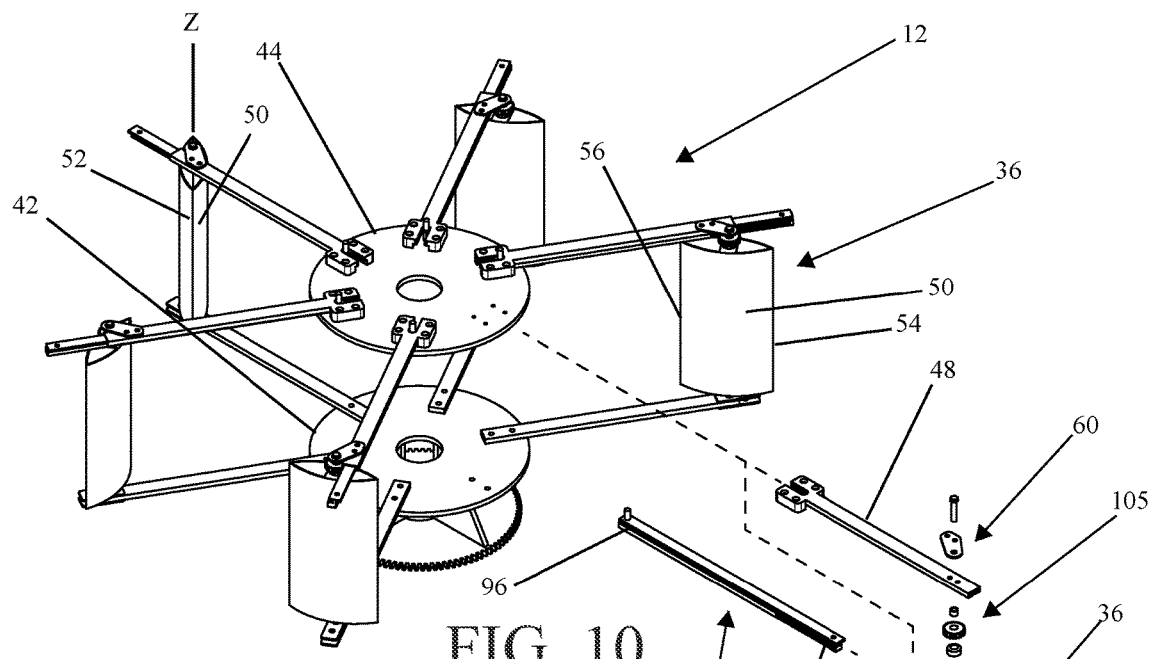
FIG. 10 is a partially unassembled view of the rotor assembly of the version shown in FIG. 1.

Referring to FIG. 10, the arm assemblies 40 each provide lateral radial positioning and support for each blade 36. In the version, each arm assembly 40 comprises a lower cantilever arm 46 and an upper cantilever arm 48 positioned parallel above and below each other respectively—each fixedly attached to and extending outward from their respective lower and upper hubs 42, 44 forming the radial support of each blade 36. In the version, as best illustrated by FIG. 6, the lower and upper cantilever arms 46, 48 are slightly offset when viewed from the plan perspective for operational purposes further described in detail below.

Figure 14:
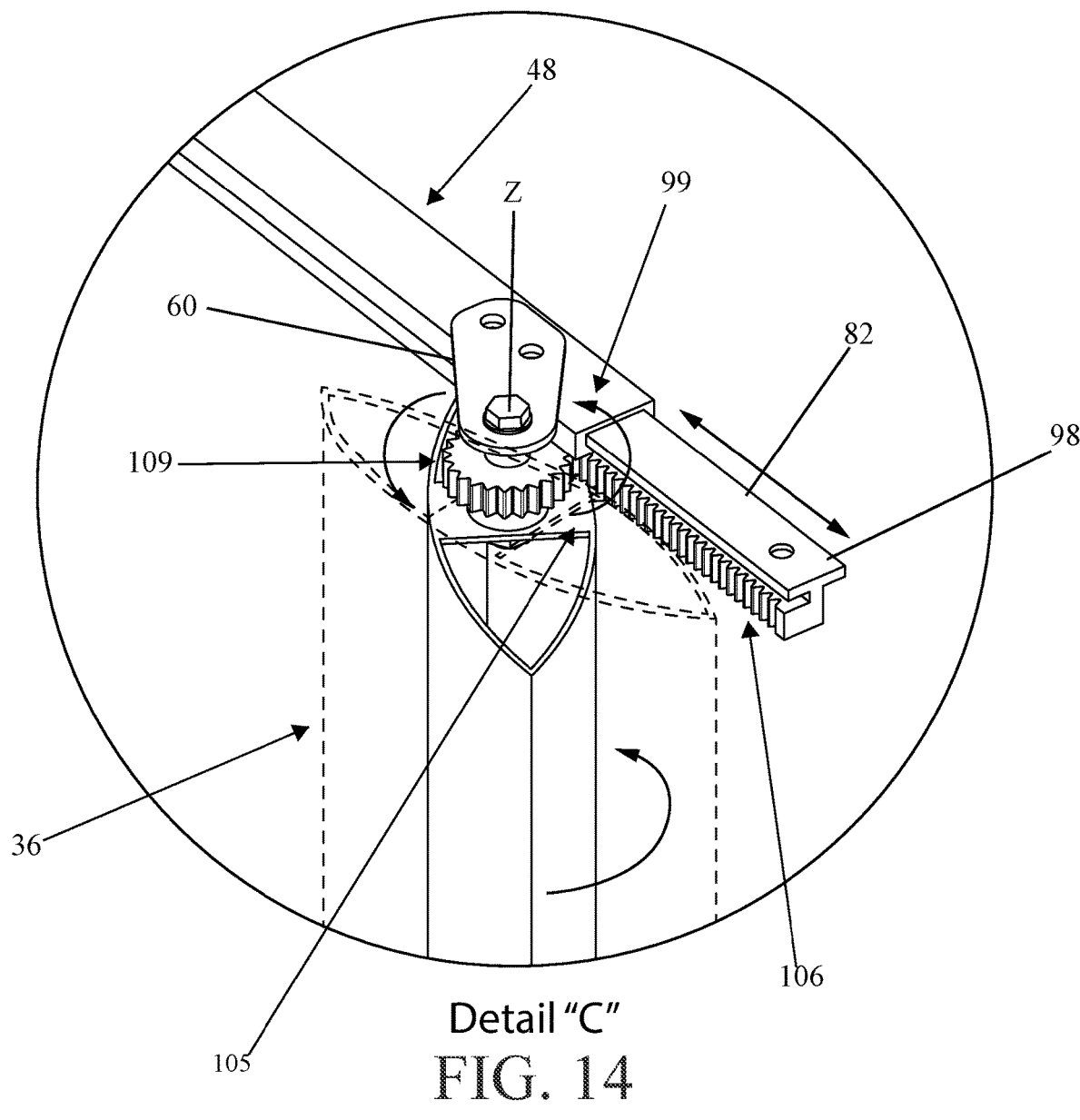
FIG. 14 is an up-close detailed view of the pivot connection assembly taken at Detail "C" in FIG. 13.

As illustrated in DETAIL C of FIG. 14, each arm assembly further includes an angled support lever 60 positioned at the distal end of each of the upper cantilever arms 48—operably extending to support and rotatably attached to the upper portion of the blade 36 at the blade axis Z. Thus, the lower cantilever arm 46 distal end and the angled support lever 60 provide rotatable axial support of each blade 36 therebetween wherein blade axis Z passes therethrough.

Each of the plurality of blades 36 is equally spaced and vertically disposed about the hub assembly 38 at the distal end of the respective arm assembly 40. Preferably, there are a total of six blades 36 and respective arm assemblies 40; however, other variations are certainly considered. Each blade 36 has a vertical blade axis Z of rotation allowing the blade 36 to pivot relative to the arm assembly 40 as the rotor assembly 12 moves through the operable cyclical path of motion.

Preferably, as best depicted in FIG. 10, generally, each blade 36 is an airfoil having an inner surface 50, an outer surface 52, a leading edge 54, a trailing edge 56, and a chord line 58 formed between the leading and trailing edges 54, 56. The camber of each blade 36, which is the asymmetry between the upper and lower surfaces 50, 52, can vary depending on the application. Moreover, the blade 36 can be symmetrical between the upper and lower surfaces 50, 52, providing an airfoil with no camber, as illustrated in the figures.

As best illustrated by FIG. 9, the wind turbine 10 further comprises the drive gear 24 that is affixed to the bottom of the hub assembly 38 and operably positioned to rotate about the central axis Y in conjunction the operation of the rotor assembly 12. As depicted in FIG. 1, the drive gear 24 is coupled to cooperate with the generator gear 22 located at the end of the drive shaft 20 of the generator 18. Thus, as the rotor assembly 12 moves through the cyclical path of motion, the rotation of the drive gear 24 provides rotational energy to the drive shaft via the generator gear 22. Ideally, the gear ratio between the generator gear 22 and the drive gear 24 is 12:1.

Figure 5:
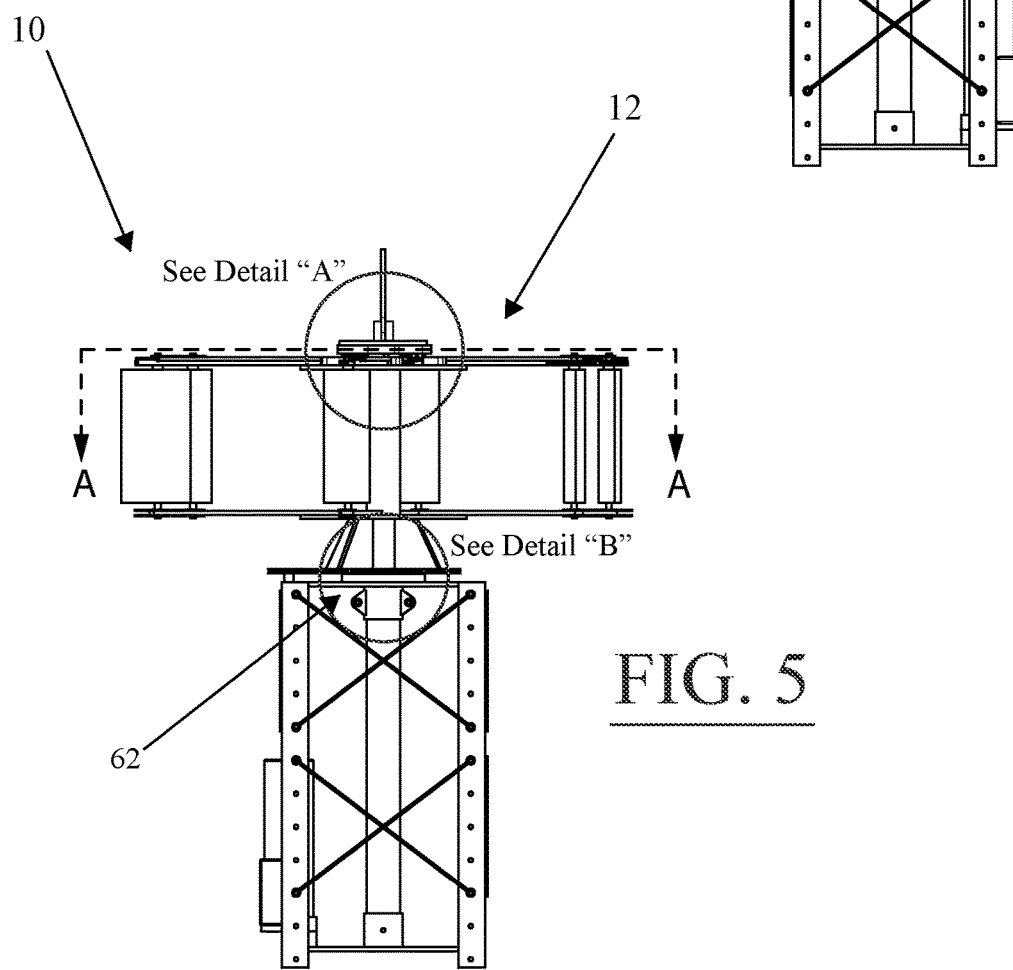
FIG. 5 is a right-side elevation view of the version show in FIG. 1.
Figure 8:
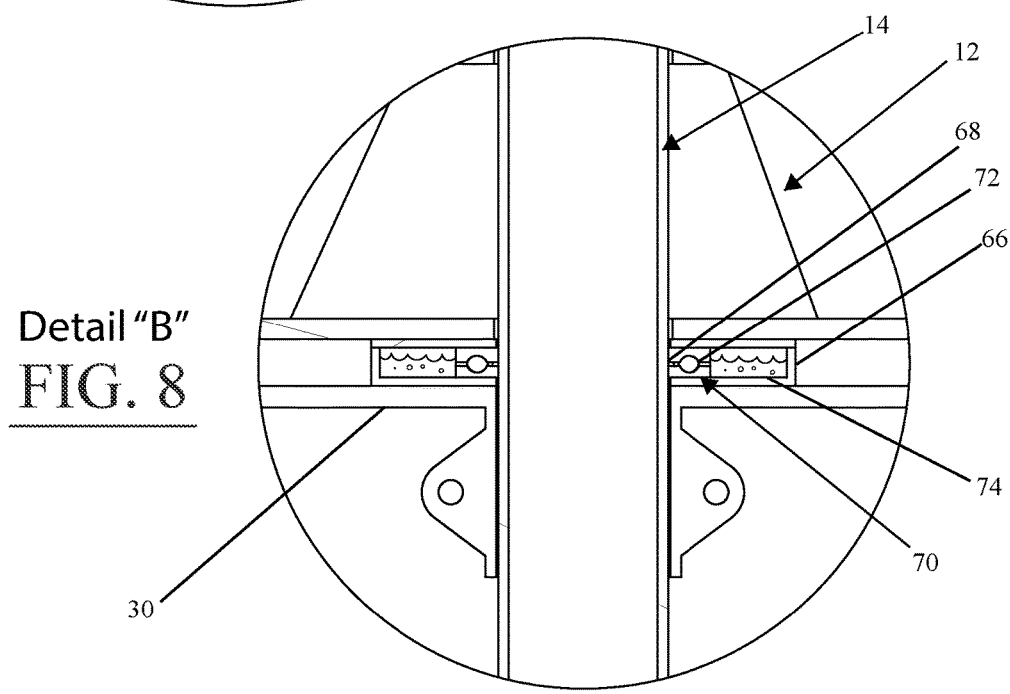
FIG. 8 is an up-close cross-sectional view taken at Detail "B" in FIG. 5 of the version shown in FIG. 1.

In the illustrated version best illustrated by FIG. 5 and FIG. 8, the rotor assembly 12 may further include a rotor bearing 62 or angular bearing for supporting and providing rotation of the rotor assembly 12 throughout its cyclical path of motion. In the version, the rotor bearing 62 is positioned at the bottom of the rotor assembly 12 and operably attached to the top surface of the elevated platform 30 of the support frame 16. The rotor bearing 62 generally comprises an outer race 66, an inner race 68, a cage retainer 70, a plurality of balls 72, and lubricant 74 (See FIG. 8). The outer race 66 fixedly attached to the elevated platform 30 and the inner race 68 operably affixed to the rotor assembly 12. Thus, the rotor assembly 12 is rotatably supported by the platform 30 and rotor bearing 62 throughout the path of rotation. Ideally, the rotor bearing 62 is a thrust bearing that permits rotation between parts but are designed to support a predominantly axial load.

Now with reference to FIG. 1-FIG. 9, the vertical axis wind turbine 10 further comprises a blade angle adjustment mechanism 15—that generally functions to control the angle of attack of each blade based on the wind direction and radial position throughout the rotor assembly 12 cyclical path of motion. The angle of attack is defined as is the angle between the chord line of the airfoil and the vector representing the relative motion between the body and the fluid (airflow) through which it is moving. For example, when the blade 36 rotates at different points throughout the rotor assembly 12 cyclical path of rotation, the blade's 36 angle of attack is automatically adjusted for any position relative to the wind direction for ideal lift and drag characteristics. The preferable angle of attack at each position throughout the rotational path is relatively based on the blade rotating angle, which is set between the blade's 36 chord line and the radius that extends from the central axis Y. See U.S. Pat. No. 7,780,411 and U.S. patent application 2017/0051720 for further clarification.

In the illustrated version, the blade angle adjustment mechanism 15 generally comprises a rotationally independent wind vane 78, a cam 80 operably affixed below the wind vane 78 having a rotational axis R that is axially aligned with the central axis Y, and a plurality of pushrods 82 operable between the cam 80 and the respective blades 36.

Figure 13:
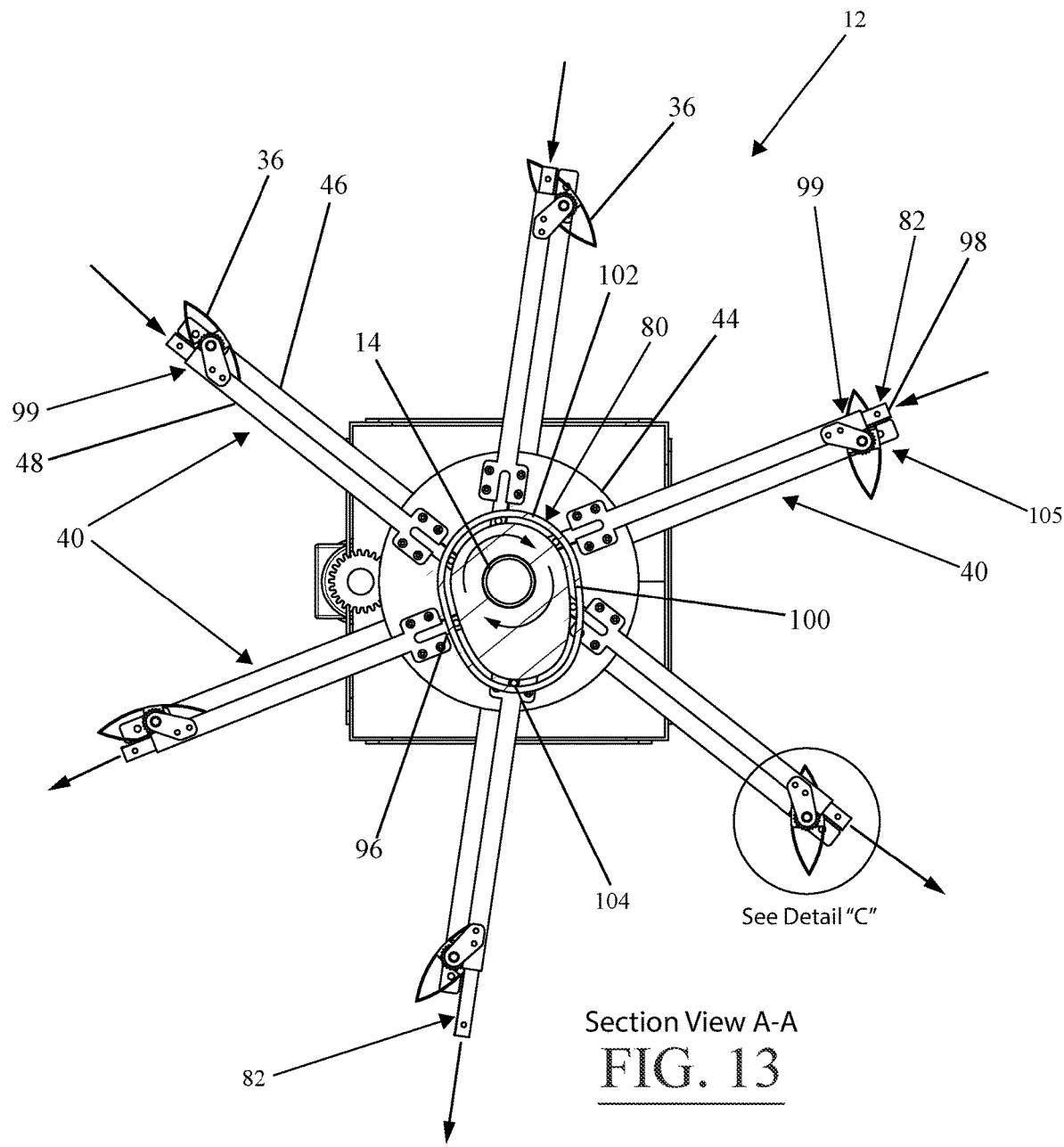
FIG. 13 is a top plan view of the version shown in FIG. 1.

As best illustrated by FIG. 13, the cam 80 is rotatably positioned about the central axis Y above the upper hub 44 of the rotor assembly 12. The cam 80 is freely rotatable about the central axis Y and is independent of the rotation of the rotor assembly 12 by way of a cam bearing 84 (See FIG. 7). Specifically, the bearing 84 provides support and rotation of the wind vane 78 and cam 80 throughout a circular path of motion. In the version, the bearing 84 operably couples the cam 80 with the distal end of the fixed central spindle 14. The bearing 84 generally comprises an outer race 86, an inner race 88, a cage retainer 90, a plurality of balls 92, and a lubricant 94. The outer race 86 is fixedly attached to the distal end of the central spindle 14, and the inner race 88 operably affixed to the cam 80 and wind vane 78. Thus, the cam 80 and wind vane 78 are rotatably supported by the fixed central spindle 14 bearing 84 throughout the path of rotation thereof. The cam bearing 84 is ideally a rotor or angular type bearing.

FIG. 10 and FIG. 13 show a perspective view and a top plan view of the vertical wind turbine 10 and, more specifically, illustrates how each pushrod 82 connects between the cam 80 and the respective blade 36 via upper cantilever arm 48. Generally, the pushrod 82 is an elongated linear rod having a proximal end 96 extending away from the central axis Y and—in the version—encased within the respective upper cantilever arm 48 terminating at a distal end 98. The upper cantilever arm 48 provides dual purposes—supporting for the respective blade 36 and functioning as a sleeve for the respective pushrod 82 contained therein.

The cam 80 provides an interior track 100 that is disposed in and follows the outer contoured perimeter of the cam 80 perimeter 102. Positioned at the proximal end 96 of each pushrod 82 is a cam follower 104 that is operably configured to follow the interior track 100 of the cam 80 throughout the rotational path of the rotor assembly 12. Further, as depicted in FIG. 14, the distal end 98 of the pushrod 82 provides a pivot connection assembly 105. In the version, the pivot connection assembly 105 comprises a linear rack gear 106 that operably engages with a pinion gear 109 that is positioned atop the respective blade 36 configured to impart rotation thereto about the blade axis Z. Thus, generally, as the rotor assembly 12 moves through its cyclical path of motion, the cam followers 104 move through the interior track 100, thereby moving each pushrod 82 either radially outward or radially inward along their linear path of motion based on the contoured perimeter of the cam 80 and distance the cam follower 104 is with respect to the rotational axis R of the cam 80 (See FIG. 13). Preferably, the interior track 100 is used as opposed to other cam designs to assist with balancing the push and pull effect of each of the pushrods 82 throughout the irregular path of the interior track 100. Thus, throughout rotation, a portion of the pushrods 82 are actively pulled towards the central axis Y by the interior track 100 while the remaining portion of the pushrods 82 are being actively pushed away from the central axis Y. Thus, significantly reducing the net force applied about the cam 80 throughout operation.

As discussed above and referring to FIG. 3, the wind vane 78 is affixed above the cam 80, wherein the wind vane 78 and the cam 80 rotate together about the central axis Y freely depending on the direction of the impinging relative wind RW. The wind vane 78 is vertically disposed and is operably configured to gravitate into the wind determining wind direction. In the version, the wind vane 78 is a thin triangular-shaped structure having a heightened rear portion 108 that tapers downward to a front point 110, wherein as airflow is introduced to the wind vane 78, the thin triangular profile causes the front point 110 to align and point in the opposite direction of the relative wind RW. Generally speaking, the wind vane 78 can range in size from having a small profile for smaller, low-velocity wind applications and larger profiles for larger, high-velocity wind applications.

With reference to FIG. 19-FIG. 37, an alternative embodiment of the wind vane assembly 300, which includes a brake release assembly 400, is disclosed. The purpose of the brake release assembly 400 is to lock the wind vane assembly 300 in a default, brake engaged position during operation. However, if the relative wind RW direction changes providing a rotational force to the vane assembly 300, the brake release assembly acts to release the brake allowing the wind vane assembly 300 to rotate into the relative wind RW. In other terms, the brake release assembly 400 provides a means to maintain the wind vane assembly 300 in a constant direction even in view of minimal changes in wind direction; however, when a sustained relative wind RW direction changes exceeding a certain velocity threshold, the brake releases thereby allowing the wind vane assembly 300 to rotate until aligned with the new relative wind RW direction.

Generally, as best shown in FIG. 19-FIG. 27, a version of the wind vane assembly 300 generally comprises a cylindrical base plate 304 for supporting rotation about the fixed central spindle 14 via a central aperture 306, and a horizontal support beam 308 in the form of an elongated rod fixedly attached to the cylindrical base plate 304 and having a forward end 310 and an aft end 312. The horizontal support beam 308 aft end 312 supports a vertical stabilizer 314 and a rudder 316 positioned aft of and vertically hinged to the vertical stabilizer 314. The forward end 310 of the horizontal support beam 308 provides support for a balance counterweight 318 in order to counter the weight of the vertical stabilizer 314 and the rudder 316 positioned on the aft end 312.

Figure 27:
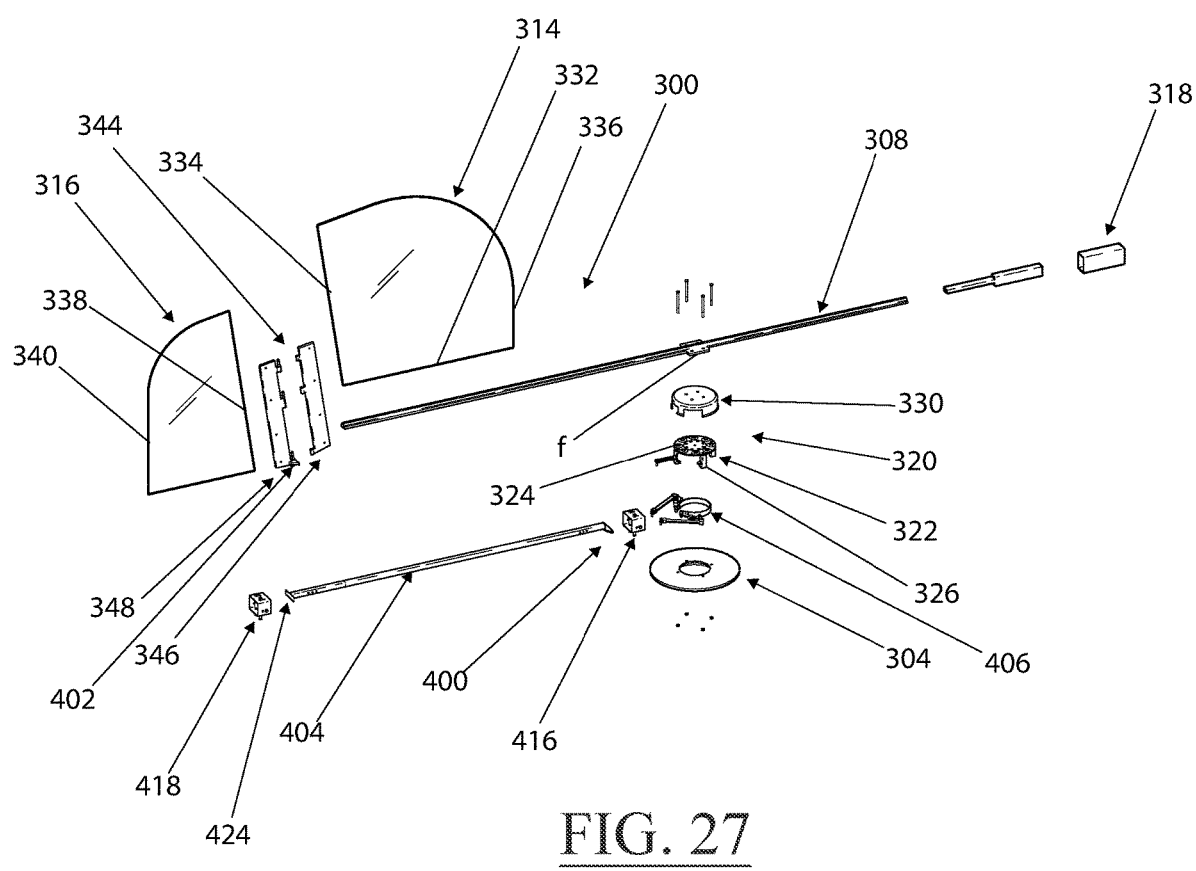
FIG. 27 is an exploded view of the wind vane assembly shown in FIG. 19.
Figures 28, 29:
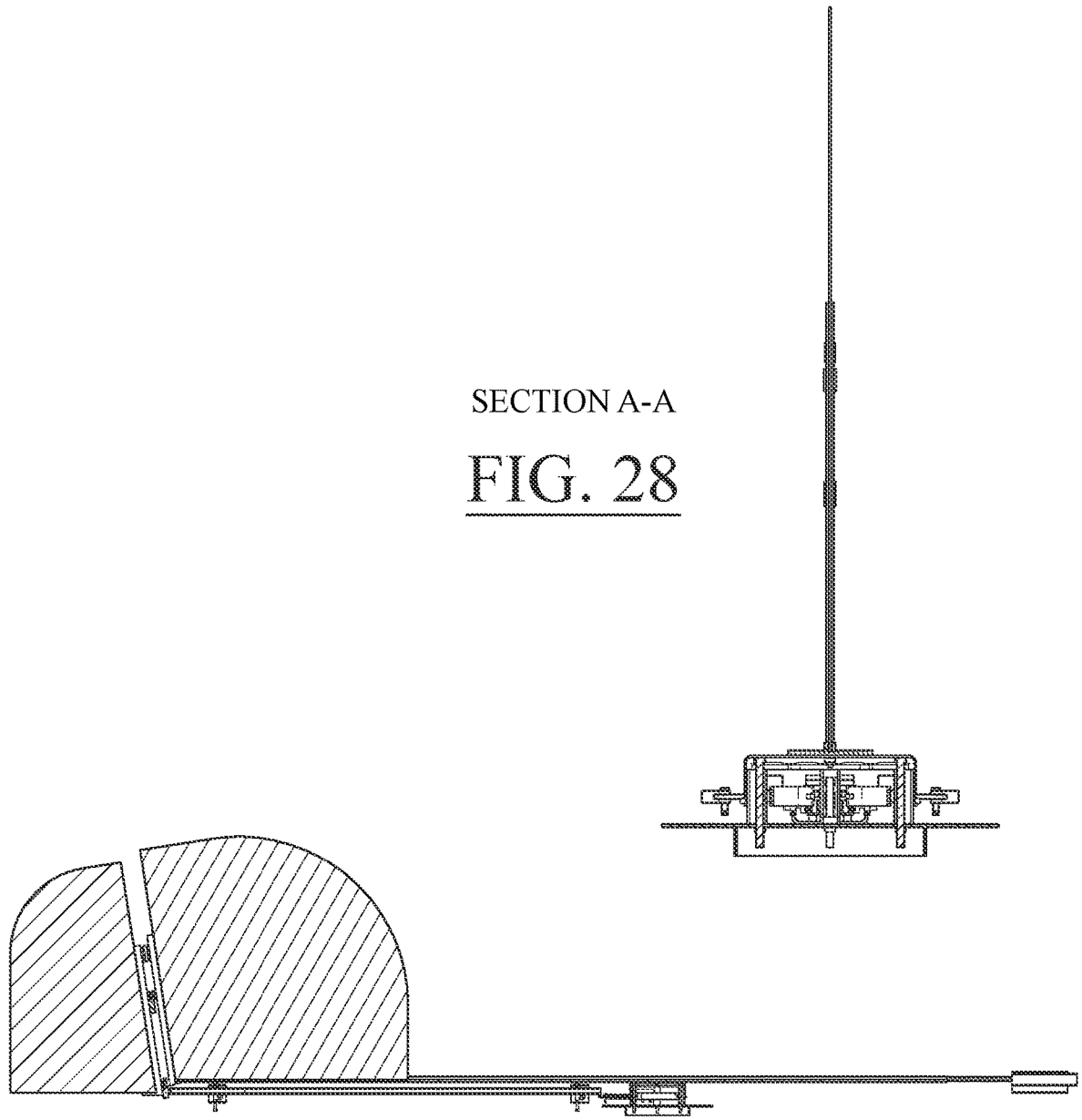
FIG. 28 is a sectional view taken along Section A-A of FIG. 22.
FIG. 29 is a sectional view taken along Section B-B of FIG. 22.
Figure 30A:
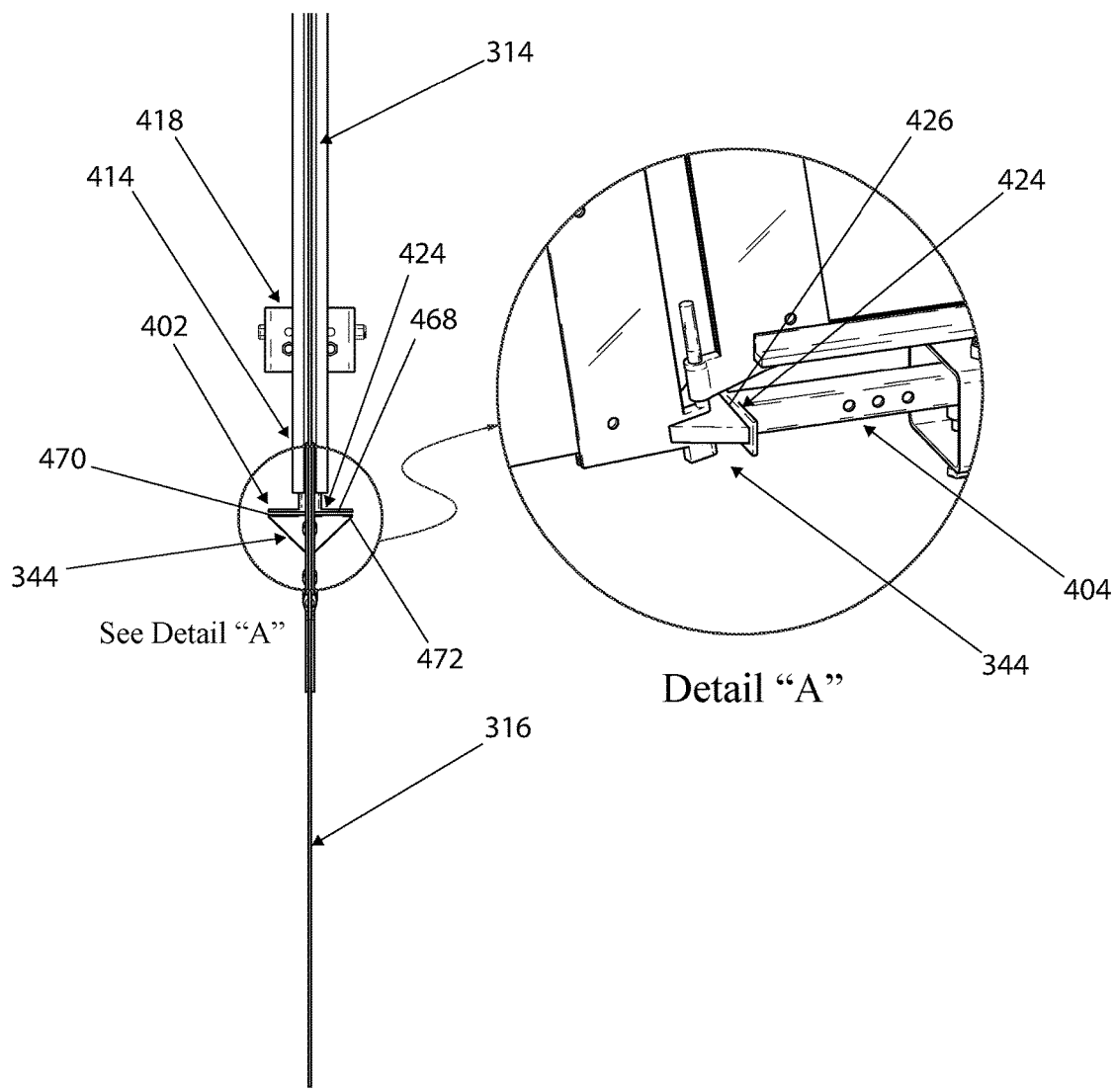
FIG. 30a is a detailed view of the vertical stabilizer of the version shown in FIG. 19.
Figure 30B:
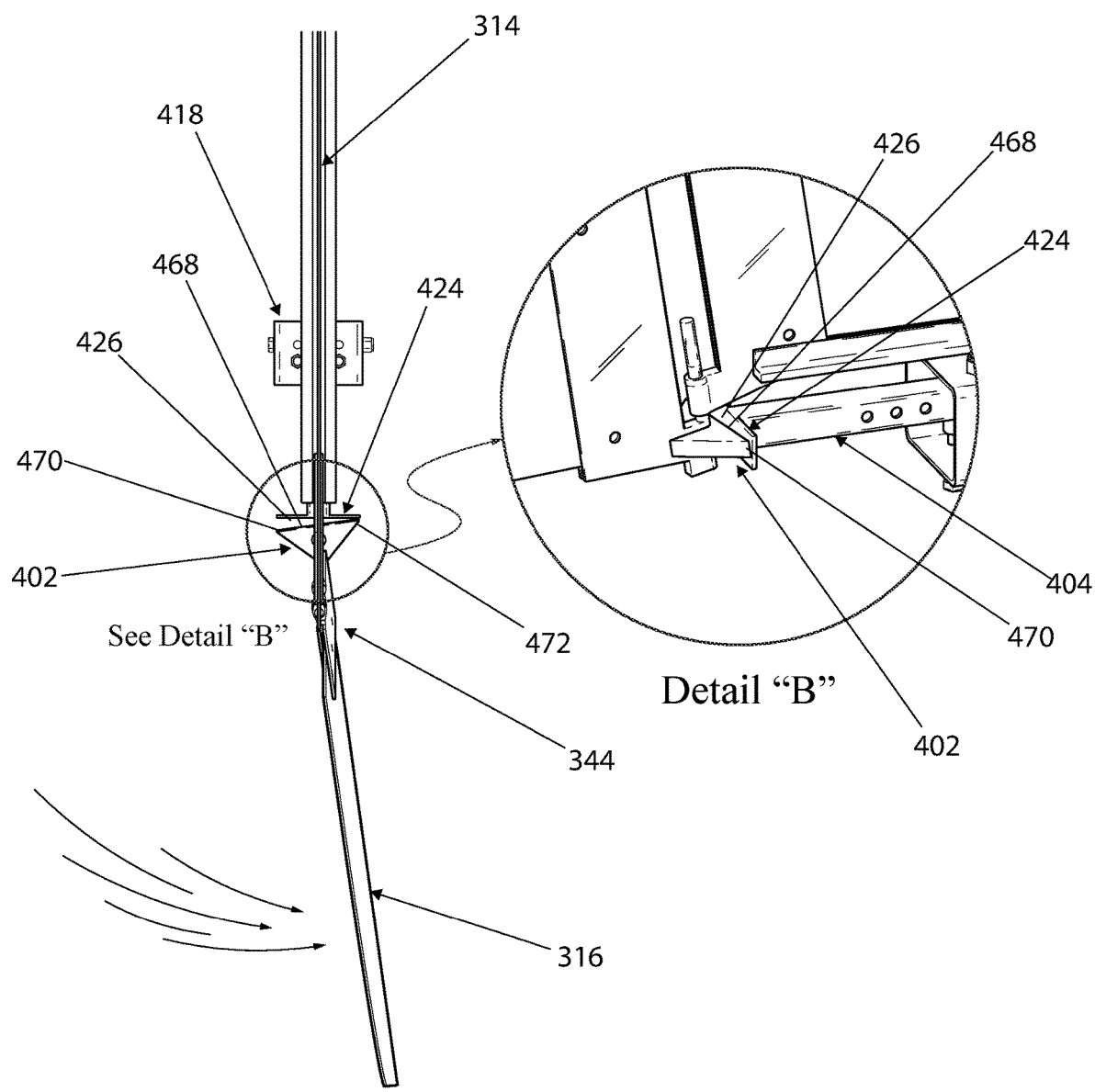
FIG. 30b is a detailed view of the vertical stabilizer of the version shown in FIG. 19.

With reference to FIG. 27 illustrating an exploded view of the wind vane assembly 300, a brake housing assembly 320 is provided that generally encapsulates the brake mechanism and central spindle 14 while supporting the horizontal support beam 308 and wind vane assembly 300 above the brake release assembly 302. In the version, the brake housing assembly 320 comprises a table 322 having a circular top 324 and, preferably, four equally spaced legs 326 provide a height and affixed to the top surface 328 of the cylindrical base plate 304; and a cap 330 that is configured to attach over and affix to the circular top 324. The horizontal support beam 308 is generally affixed to the top of the riser cap 330 at a fulcrum point f, thereby balancing the aft end 312 supported components with the forward end 310 balance counterweight 318 that provides 360 degrees of rotation about the fixed central spindle 14.

In the version, the vertical stabilizer 314 is vertically affixed to the aft end 312 of the horizontal support beam 308. The vertical stabilizer 314 has a bottom edge 332, a trailing edge 334, and a leading edge 336. In the illustrated version, the leading edge is curved in nature connecting the bottom edge 332 and the trailing edge 334. The bottom edge 332 of the vertical stabilizer 314 is longitudinally aligned with the longitudinal axis Z of the aft end 312 of the horizontal support beam 308. The trailing edge 334 is generally perpendicular or angled aftward as compared to the bottom edge 332 and the longitudinal axis Z of the horizontal support beam 308 (See FIG. 22).

The rudder 316 generally includes a leading edge 338 parallel to the vertical stabilizer trailing edge 334, a bottom edge 342, and a rear trailing edge 340. In the illustrated version, the rear trailing edge 340 is curved, connecting the leading edge 338 with the bottom edge 342.

The rudder 316 is rotatably connected to the trailing edge 334 of the vertical stabilizer 314 via a hinge 344. In the version, the hinge 344 includes a forward hinge plate 346 attached to a length along the trailing edge 334 of the vertical stabilizer 314 and an aft hinge plate 348 attached to the leading edge 338 of the rudder 316. The vertical stabilizer 314 is fixed in position relative to the horizontal support beam 308, and the rudder 316 is operably configured to rotate about the hinge axis Y through an angular path of motion, thereby providing a rotational force about the central axis R and central spindle 14 depending on the shift in wind velocity and direction.

Generally, a balance counterweight 318 is affixed to the forward end 310 of the horizontal support beam 308 in order to counter the weight of the aft end 312 components, including the vertical stabilizer 314, rudder 316, and hinge 344.

As best shown in FIG. 27-FIG. 37, the brake release assembly 400 generally comprises a brake release member 402, a linear rod 404, a concentric band 406, and a first and second lever assemblies 410a, 410b. Collectively, the brake release assembly 400 components counter rotational forces applied to the wind vane assembly 300 due to abrupt changes in wind velocity and direction, which will be described in more detail below. Therefore, during these events, slowing down the angular velocity provides a more stable wind vane assembly 300 throughout operation and wind changes.

Figure 19:
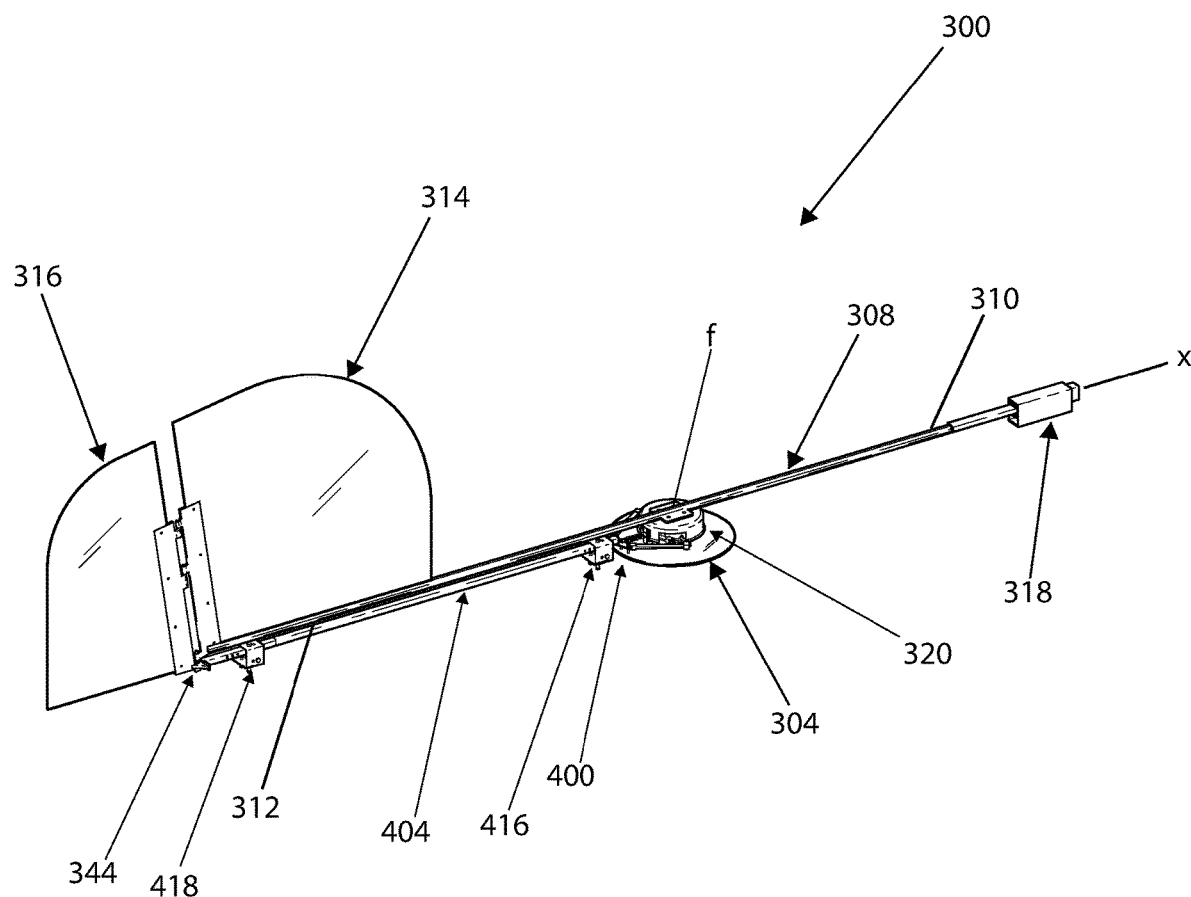
FIG. 19 is a perspective view of a second version of the wind vane assembly.
Figure 20:
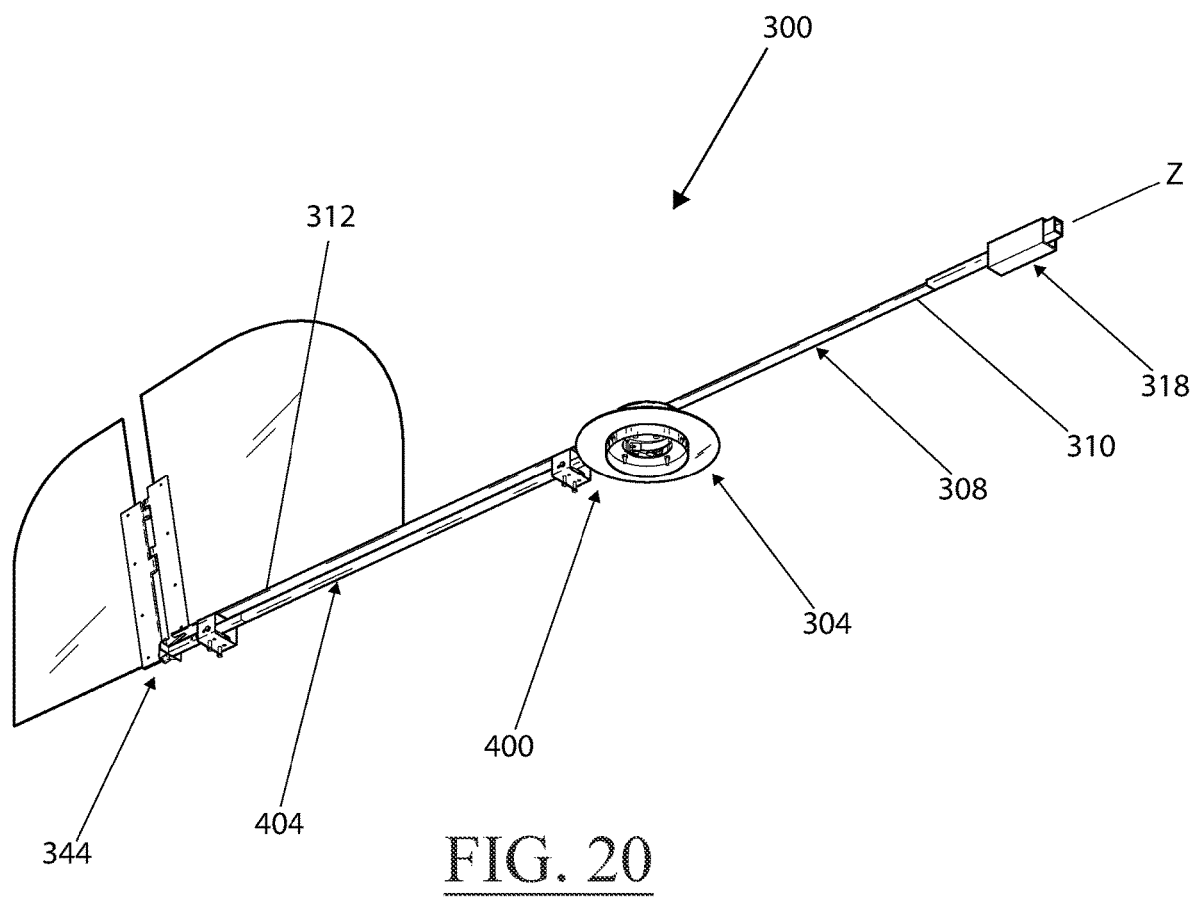
FIG. 20 is a bottom perspective view of the wind vane assembly shown in FIG. 19.
Figure 21:
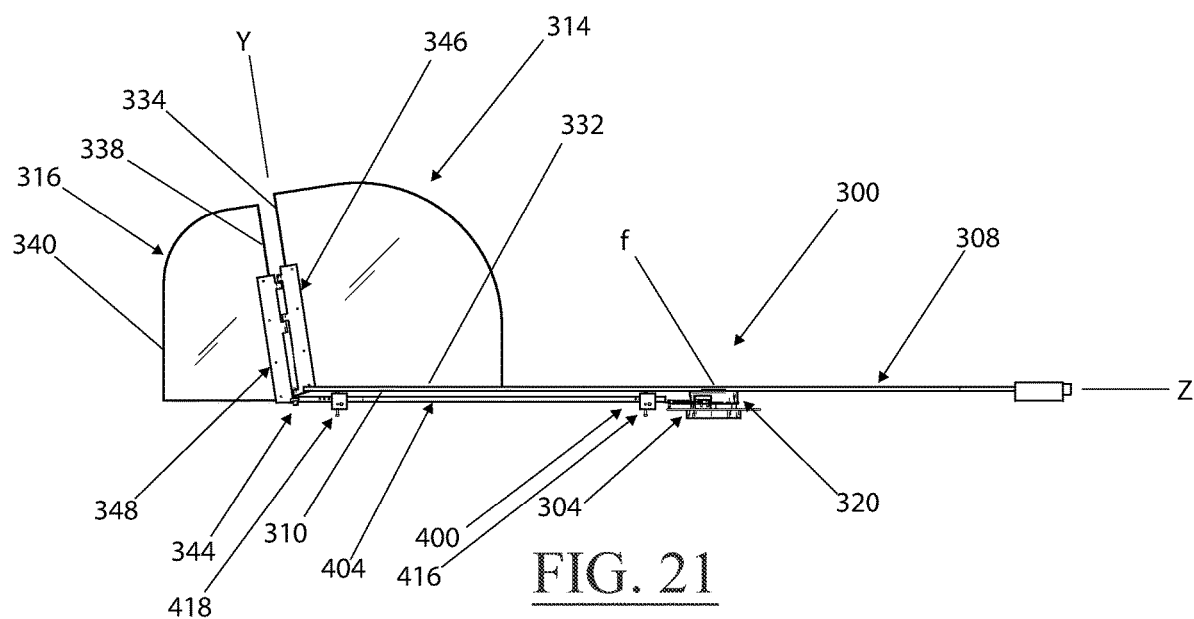
FIG. 21 is a left-side elevation view of the wind vane assembly shown in FIG. 19.
Figure 22:
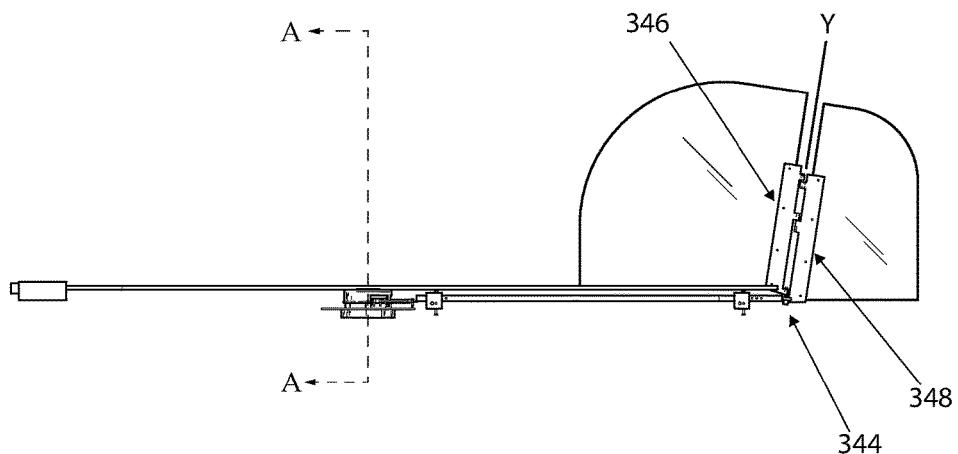
FIG. 22 is a right-side elevation view of the wind vane assembly shown in FIG. 19.
Figure 23:
FIG. 23 is a front-side elevation view of the wind vane assembly shown in FIG. 19.
Figure 24:
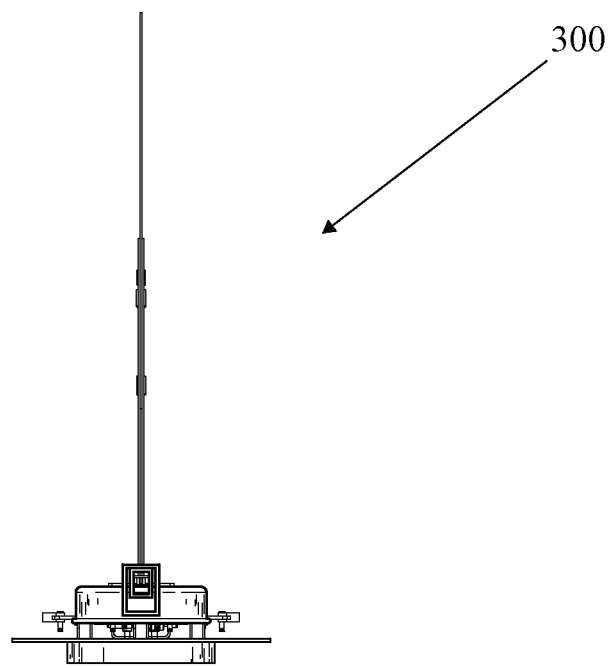
FIG. 24 is a rear-side elevation view of the wind vane assembly shown in FIG. 19.
Figure 25:
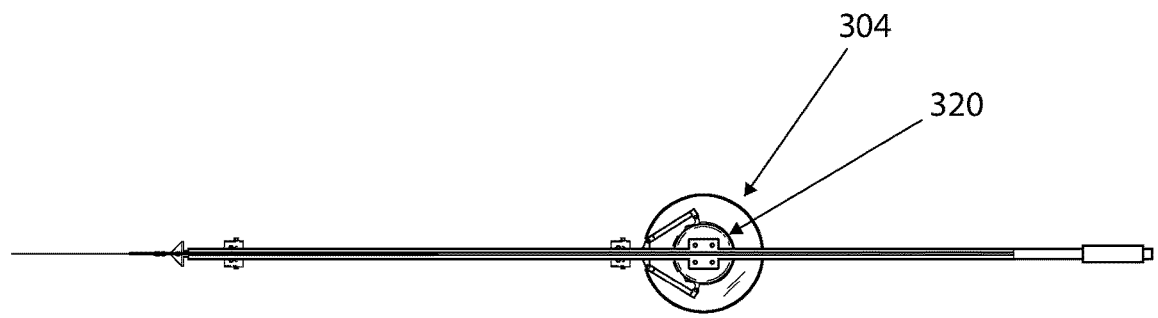
FIG. 25 is a top plan view of the wind vane assembly shown in FIG. 19.
Figure 26:
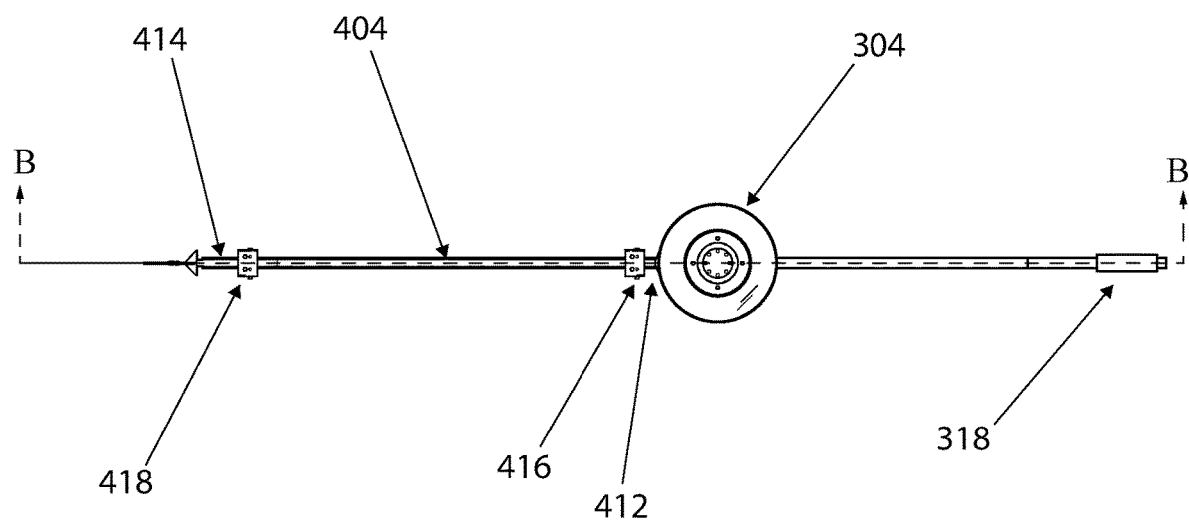
FIG. 26 is a bottom plan view of the wind vane assembly shown in FIG. 19.
Figure 31A:
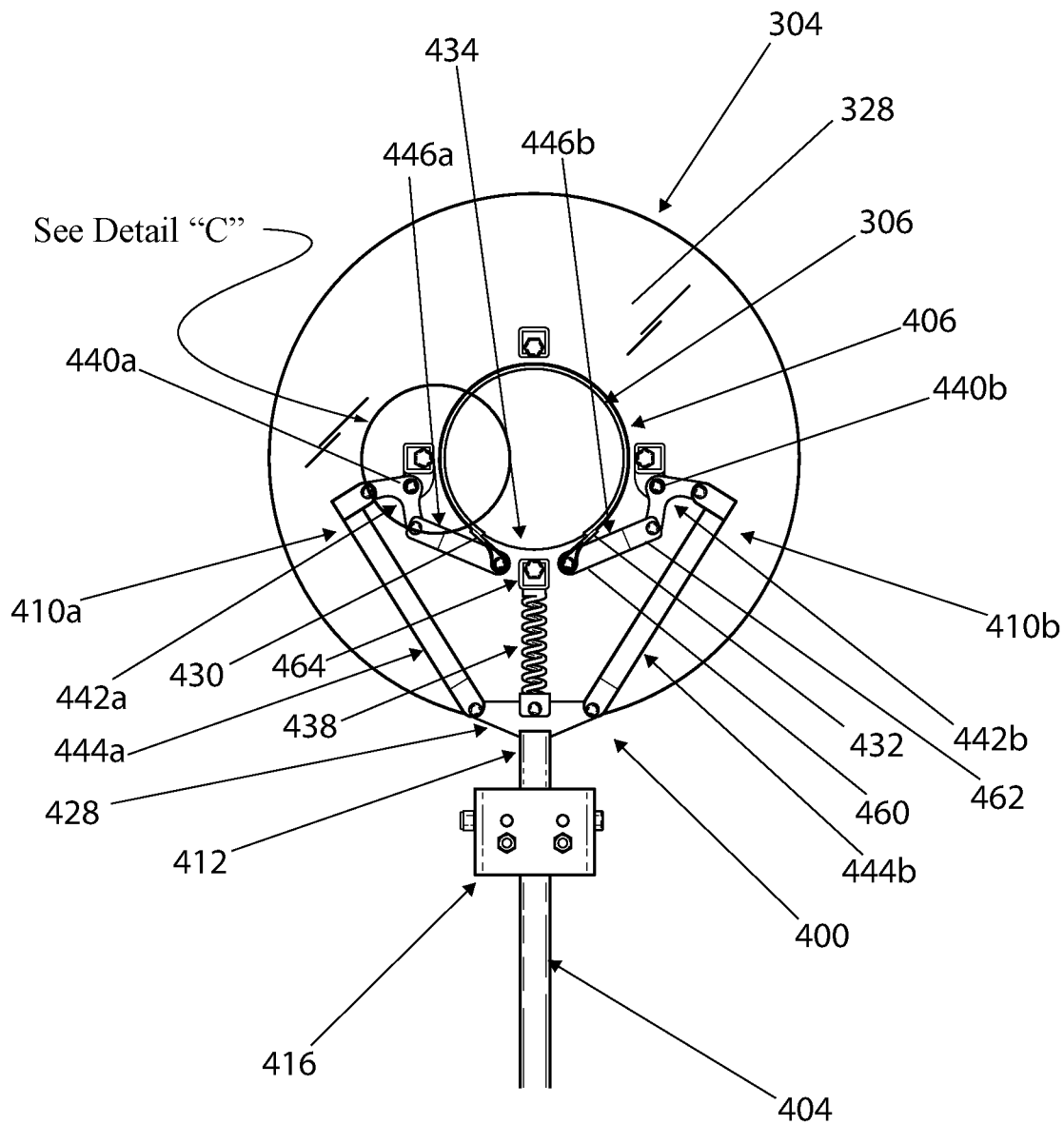
FIG. 31a is a top plan view of the brake release assembly of the version shown in FIG. 19.
Figure 31B:
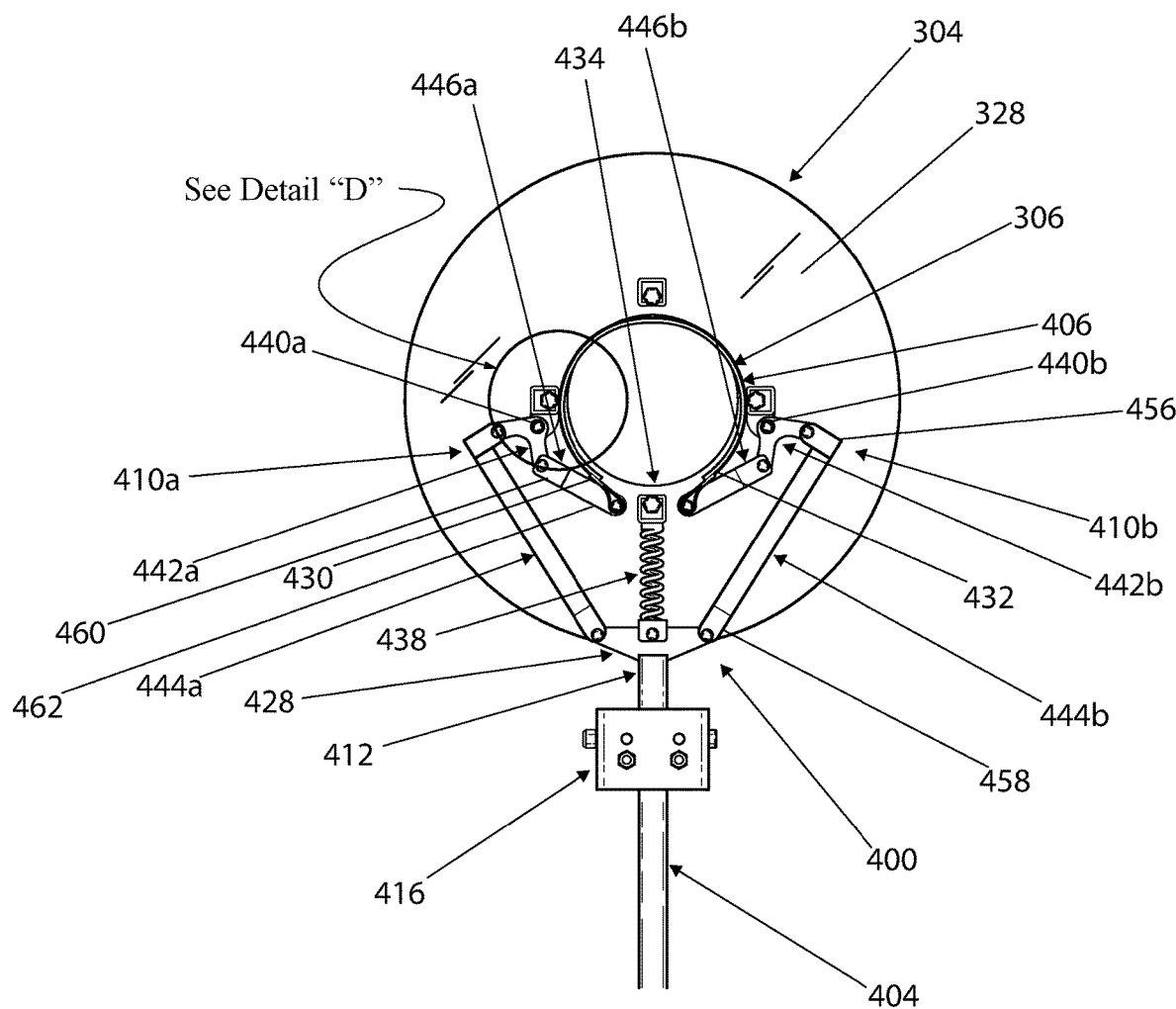
FIG. 31b is a top plan view of the brake release assembly of the version shown in FIG. 19.
Figure 32:
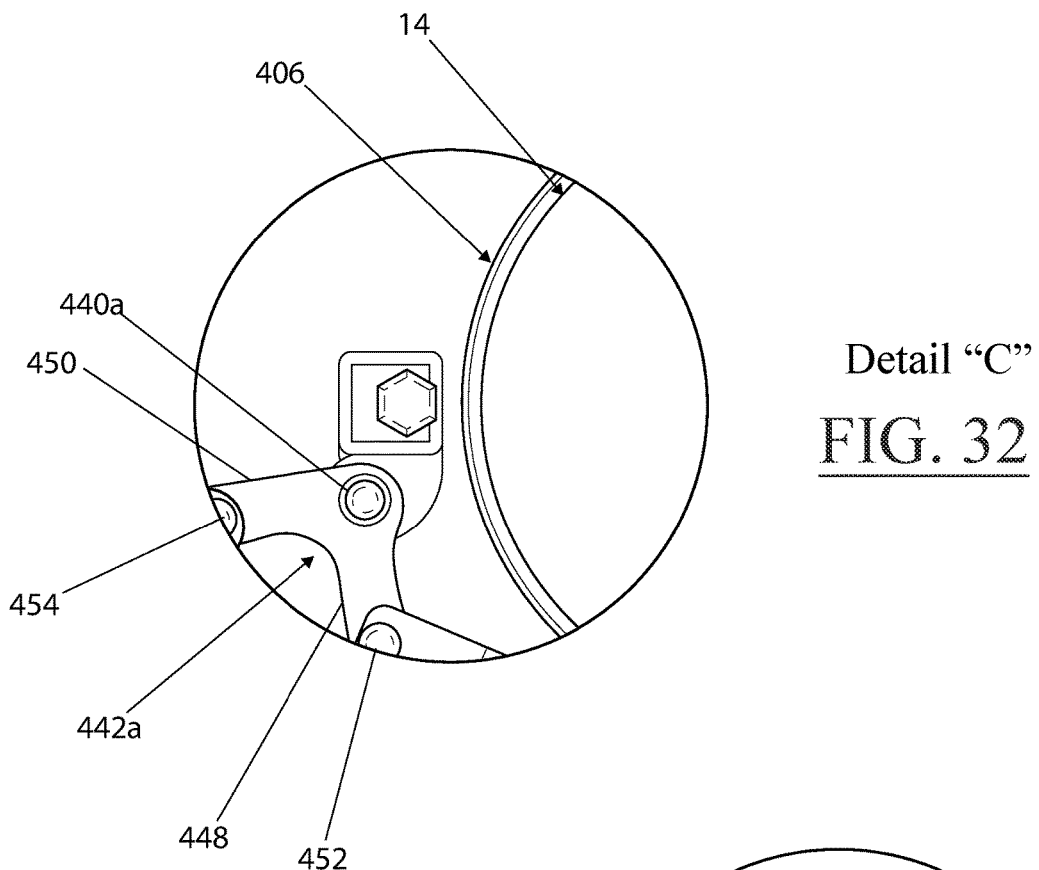
FIG. 32 is an up-close view taken at Detail "C" in FIG. 31a of the version shown in FIG. 19.
Figure 33:
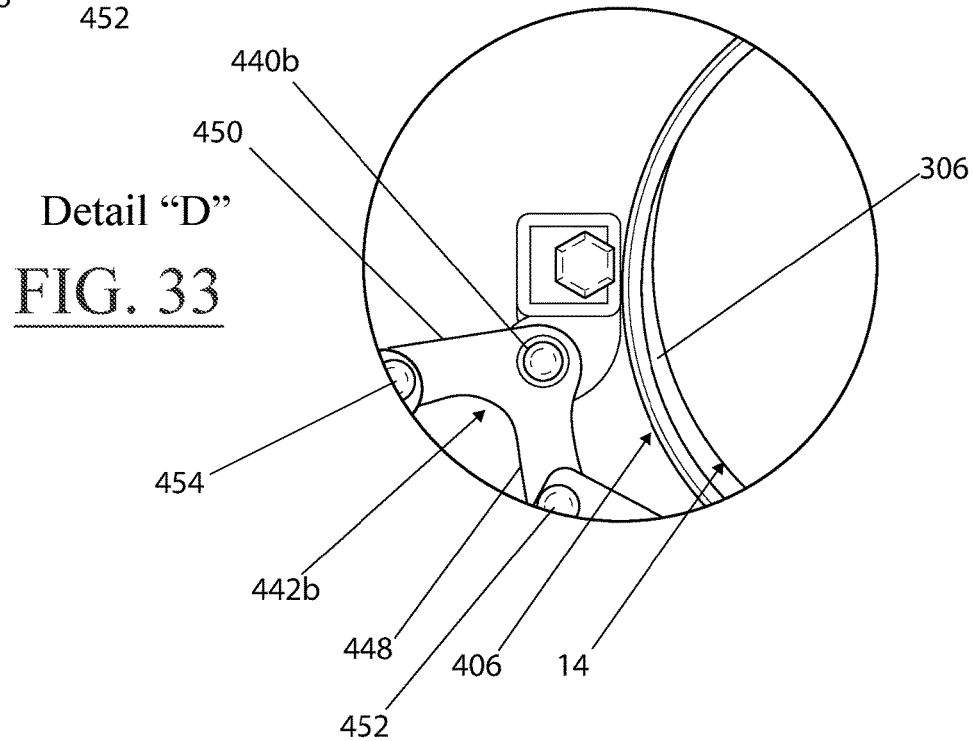
FIG. 33 is an up-close view taken at Detail "D" in FIG. 31b of the version shown in FIG. 19.

As best shown in FIG. 19 and FIG. 20, the linear rod 404 is configured to be translatable within a longitudinal path between a translated forward, default brake engagement position FIG. 31a and a translated rearward, brake released position FIG. 31b. The linear rod 404 has a length between a proximal end 412 and a distal end 414 and is positioned beneath and in parallel in relation to the horizontal support beam 308.

Figure 34:
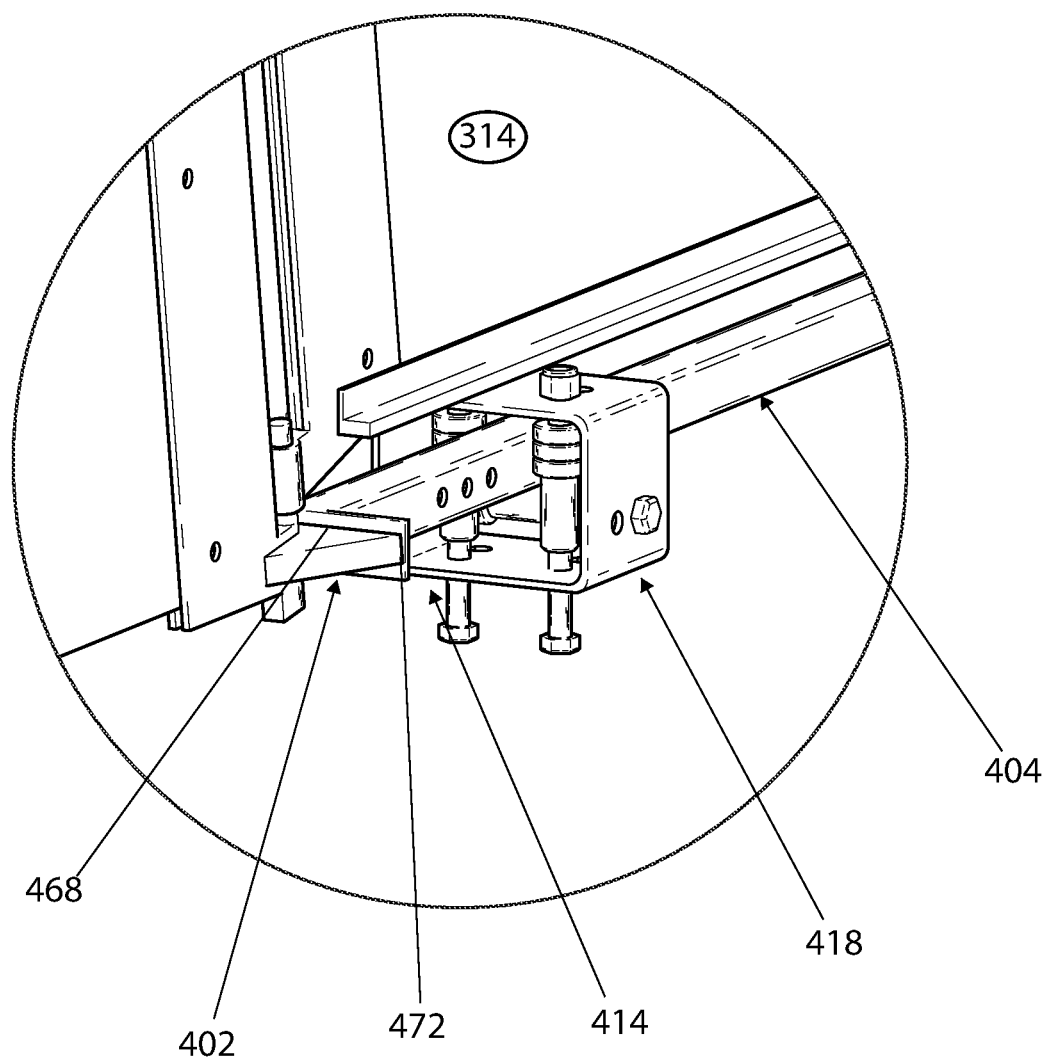
FIG. 34 is an up-close view of the rudder and hinge of the version shown in FIG. 19.
Figure 35:
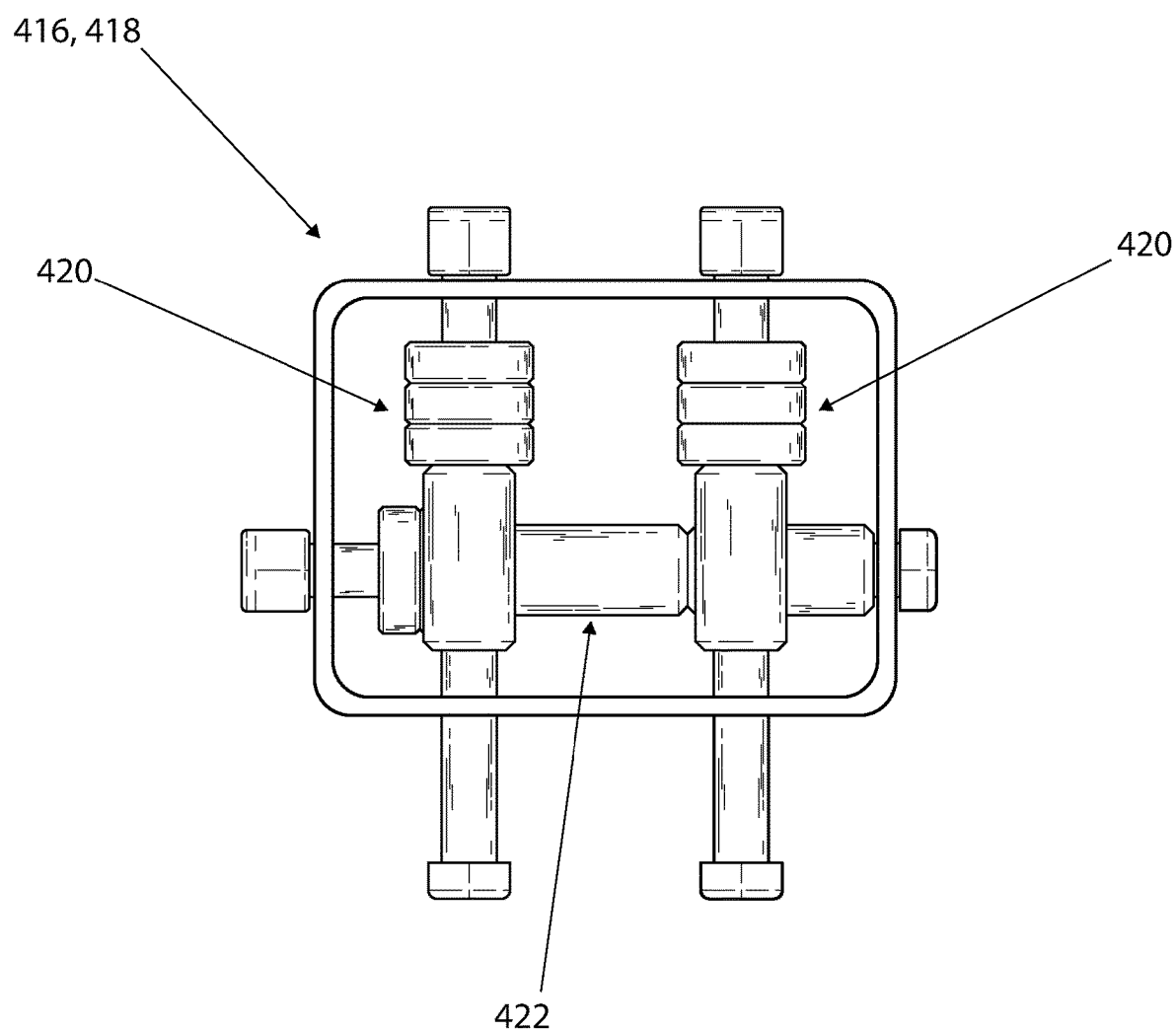
FIG. 35 is a front elevation view of a guide roller of the version shown in FIG. 19.
Figure 36:
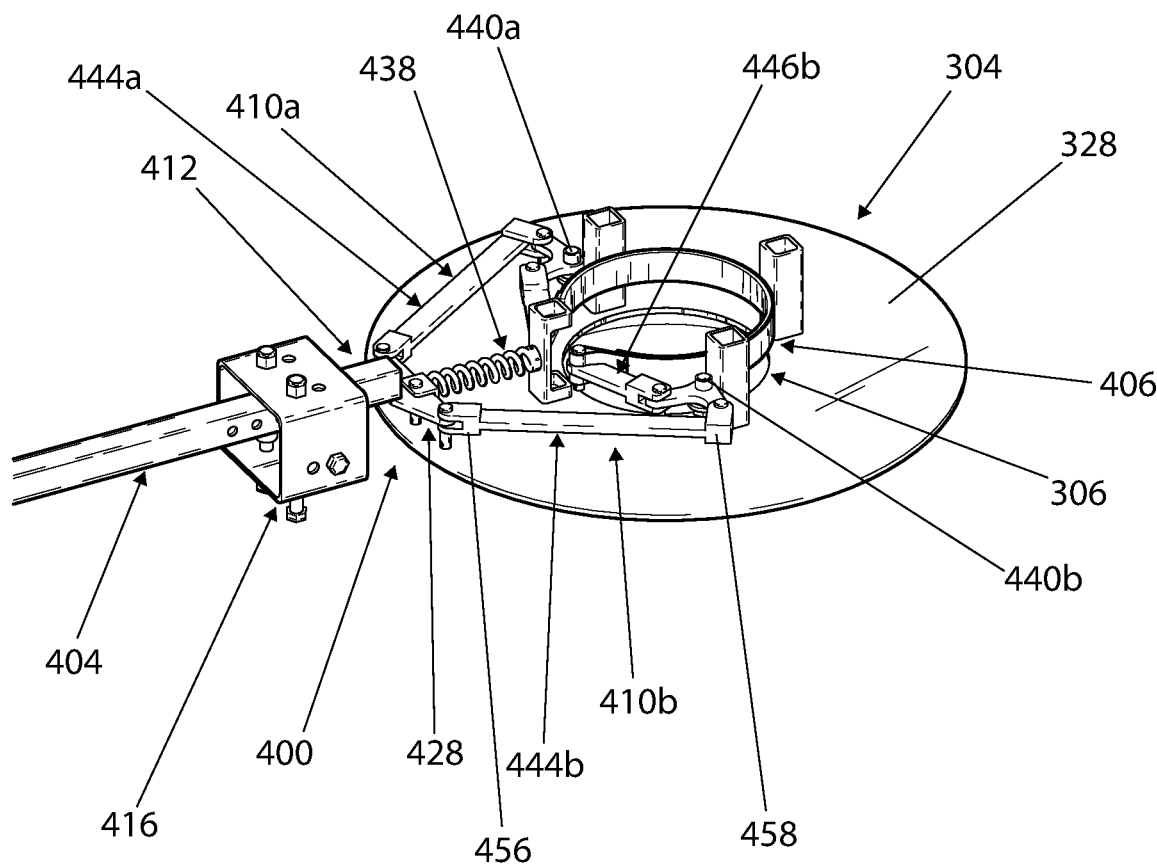
FIG. 36 is a perspective view of the brake release assembly of the version shown in FIG. 19.
Figure 37:
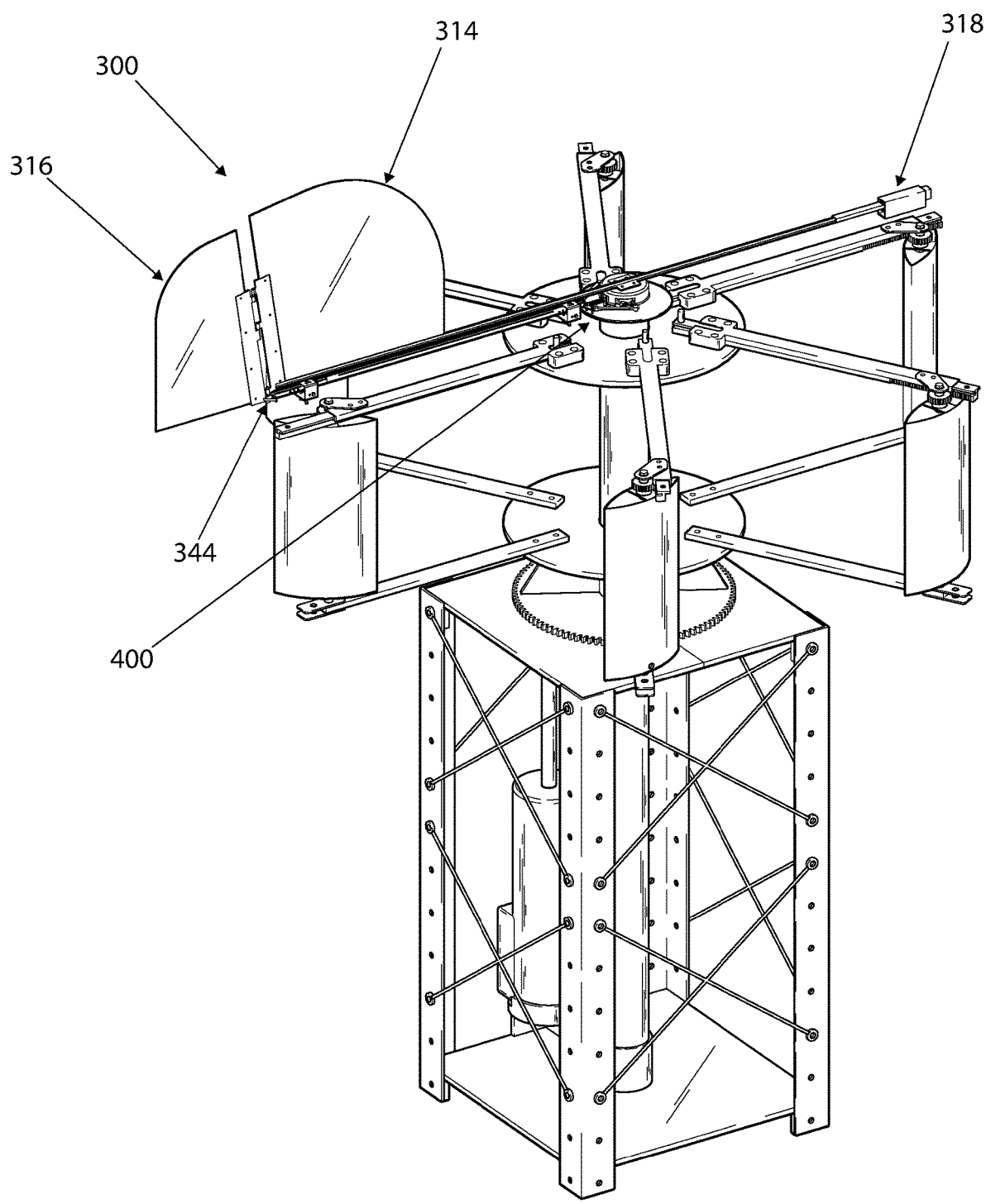
FIG. 37 is a perspective view of a version of the vertical axis wind turbine utilizing the wind vane assembly of the version shown in FIG. 19.

As best shown in FIG. 34 and FIG. 35, the linear rod 404 translatable path between the default brake engaged position and the brake released position is supported and provided by a forward guide roller 416 and a rear guide roller 418. The rear guide roller 418 is affixed beneath the horizontal support beam 308 aft end 312, and the forward guide roller 416 is affixed beneath the horizontal support beam 308 aft and near the cylindrical base plate 304. During operation, the brake engaged position is achieved by translating the linear rod 404 outward within the rear guide roller 418 and the forward guide roller 416, thereby actuating the concentric band 406, slowing and locking the wind vane assembly 300. In the illustrated version of FIG. 35, each guide roller 416, 418 comprises a plurality of rollers, including two parallel vertical axis rollers 420 and a bottom horizontal roller 422.

As best shown in FIG. 27, the linear rod 404 distal end 414 terminates at a plate 424, providing a flat contact surface 426 that is perpendicular to its longitudinal path of the linear rod 404. The proximal end 412 of the linear rod 404 terminates at a junction member 428 for operably connecting to the first and second lever assemblies 410a, 410b.

As best shown in FIG. 31a and FIG. 31b, the brake release assembly 400 includes a concentric band 406 adapted to radially clutch the fixed central spindle 14 while in the default, brake engaged position. In the version, the concentric band 406 is positioned such that it partially encircles about the fixed central spindle 14, terminating at opposing first and second ends 430, 432. The first and second ends 430, 432 form a gap 434 therebetween that allows the concentric band 406 to expand and contract about the fixed central spindle 14 throughout operation.

FIG. 31a and FIG. 31b provide up-close top plan views showing the brake assembly while in the default brake engaged position (FIG. 31a) and the brake released position (FIG. 31b). Further, the brake release assembly 400 comprises a series of levers that are operably configured to engage or release the braking by pinching or expanding the concentric band 406. For example, while in the default, brake engaged position, the biasing spring 438 provides an inward force when compressed to the linear rod 404 that causes the series of levers to translate outward and away from the central spindle 14, moving the first and second ends 430, 432 of the concentric band 406, thereby releasing the concentric band 406 from clutching and contacting the central spindle 14. Oppositely, in order to release the brake, the series of levers 408 translate the outward motion of the linear rod 404 into rotational forces applied to the first and second ends 430, 432 of the concentric band 406, thereby causing the concentric band 406 to radially disengage contact with the fixed central spindle 14 during operation, thereby allowing the wind vane assembly 300 to rotate about the central spindle 14.

As best shown in FIG. 31a and FIG. 31b, the series of levers 408 comprise mirrored first and second lever assemblies 410a, 410b that operably rotate about opposing first and second hinged axis points 440a, 440b affixed to the cylindrical base plate 304. Preferably, the hinged axis points 440a, 440b are positioned at opposing sides of the central aperture 306 and affixed with the top surface 328 of the cylindrical base plate 304. Generally, each of the first and second lever assemblies 410a, 410b comprise a primary rotatable member 442a, 442b, a drive member 444a, 444b, and a tension member 446a, 446b that operably combine to translate the forward, biased movement of the linear rod 404 into a squeezing or pinching action of the concentric band 406 in order to engage the central spindle 14 while in the default brake engaged position.

Each primary rotatable member 442a, 442b is rotatable about the respective fixed axis point 440a, 440b, with an interior arm 448 and an exterior arm 450 extending outward at an angle. The interior arm 448 terminates at an interior rotatable hinge point 452, and the exterior arm 450 terminates at an exterior rotatable hinge point 454. Further, each drive member 444a, 444b in the form of a rod has a length, a first end 456 and a second end 458. The first end 456 is operably hinged with the exterior arm 450 of the primary rotatable member 442 at the exterior rotatable hinge point 454. The second end 458 is operably hinged with the junction member 428 of the linear rod 404.

The tension members 446a, 446b each are generally a shortened rod having a length, an interior end 460, and an exterior end 462 and are for connecting the interior arm 448 of the primary rotatable member 442 with the respective first and second ends 430, 432 of the concentric band 406. The exterior end 462 of the tension member 446 is hingedly connected to the primary rotatable member 442 interior arm 448 interior rotatable hinge point 452. The interior end 460 of the tension member 446 is hingedly connected to the respective first and second ends 430, 432 of the concentric band 406.

As shown, a biasing spring 438 or other elastic means is operably connected between the junction member 428 to a fixed point 464 on the cylindrical base plate 304, which during operation biases the brake release assembly 400 and linear rod 404 in the default, brake engaged position. Therefore, when the wind direction and velocity remain unchanged, the brake release assembly 400 maintains the wind vane assembly 300 in a static manner respective to the central spindle 14.

Lastly, the brake release assembly 400 further comprises a brake release member 402 that is operably attached to the rudder 316 extending laterally. The brake release member 402 is configured to rotate with the rudder 316 in either the clockwise or counterclockwise direction about the rudder hinge axis Y. When the rudder 316 rotates during a change in wind velocity or direction, the brake release member 402 actively contacts the linear rod 404 distal end 414 plate 424 moving the linear rod 404 rearward. Thus, as the direction of the wind changes, the rudder 316 rotates due to the application of force (See FIG. 30b) about the hinge axis Y between the vertical stabilizer 314 and the rudder 316, whereby the brake release member 402 is rotated forward and pushes the linear rod 404 inward, which actuates the first and second lever assemblies 410a, 410b to cause the concentric band 406 to release the fixed central spindle 14, thereby allowing the wind vane assembly 300 to rotate about the fixed central spindle 14 in accordance with the direction of the relative wind RW. In the version, the brake release member 402 is a horizontal flat member having a triangular plan view having a free edge 468 terminating at lateral contact points 470, 472 (see FIG. 30a).

Generally, the vertical axis wind turbine 10 does not require any form of energy aside from wind energy to operate. In order to initiate rotation of the rotor assembly 12, the vertical axis wind turbine 10 is exposed to wind or other airflow typically provided at a perpendicular direction relative to the central axis Y. As described above, the wind vane 78 automatically moves and aligns itself with the direction of the relative wind RW. Therefore, as the wind vane 78 rotates, the cam 80 affixed therewith rotates, which positions the shaped interior track in the ideal arrangement, which will simultaneously position each blade 36 angle of attack or attitude to maximize lift and rotational force about the central axis Y. Thus, as the direction of the relative wind changes, the cam 80 and interior track 100 autonomously adjust via the wind vane 78 to accommodate and facilitate the maximum amount of rotational force. By way of the drive gear 24, the rotational mechanical energy is transferred to the electric generator 18 via the generator gear 22 and drive shaft 20. Thereafter, the electrical energy generated by the generator 18 can be supplied to an existing electrical grid or be store by way of batteries.

As it relates to the brake release assembly 302, the general purpose of the operation is, by default, to lock and prevent the wind vane assembly 300 from rotating about the central axis 14. However, when the relative wind changes, providing enough rotational force upon the rudder 316, the brake release assembly 400 releases the concentric band 406 from clutching the central spindle 14. In further detail, upon change in the relative wind RW, the rudder 316 rotates about the rudder 316 hinge axis Y causing the brake release member 402 to contact and move rearward the linear rod 404 by way of the plate 424 distal end 414. The rearward movement of the linear rod 404 causes the first and second lever assemblies 410a, 410b to rotate about the first and second hinged axis points 440a, 440b while compressing the biasing spring 438, thereby simultaneously separating or expanding the first and second ends 430, 432 of the concentric band 406 releasing the central spindle 14.

Oppositely, when the relative wind RW direction stabilizes, the rudder 316 aligns with the vertical stabilizer 314, thereby removing the application of force of the brake release member 402 returning to a default, neutral position. Thereafter, the biasing spring 438 under compression pushes the linear rod 404 forward, causing the first and second lever assemblies 410a, 410b to rotate inward, thereby causing the concentric band to radially clutch the fixed central spindle applying a braking action and locking the wind vane assembly in position relative to the central spindle 14.

Figure 15:
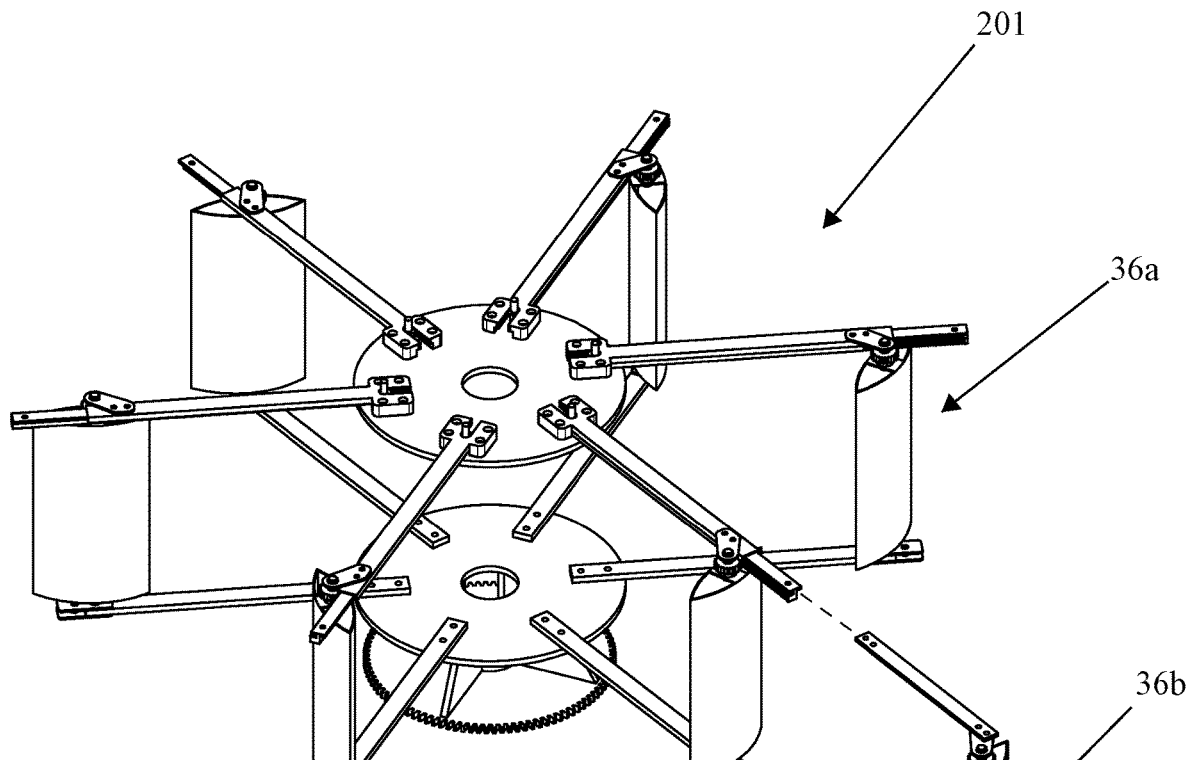
FIG. 15 is a front perspective view of a second example version of the rotor assembly having multiple tiers of radially positioned blades.
Figure 16:
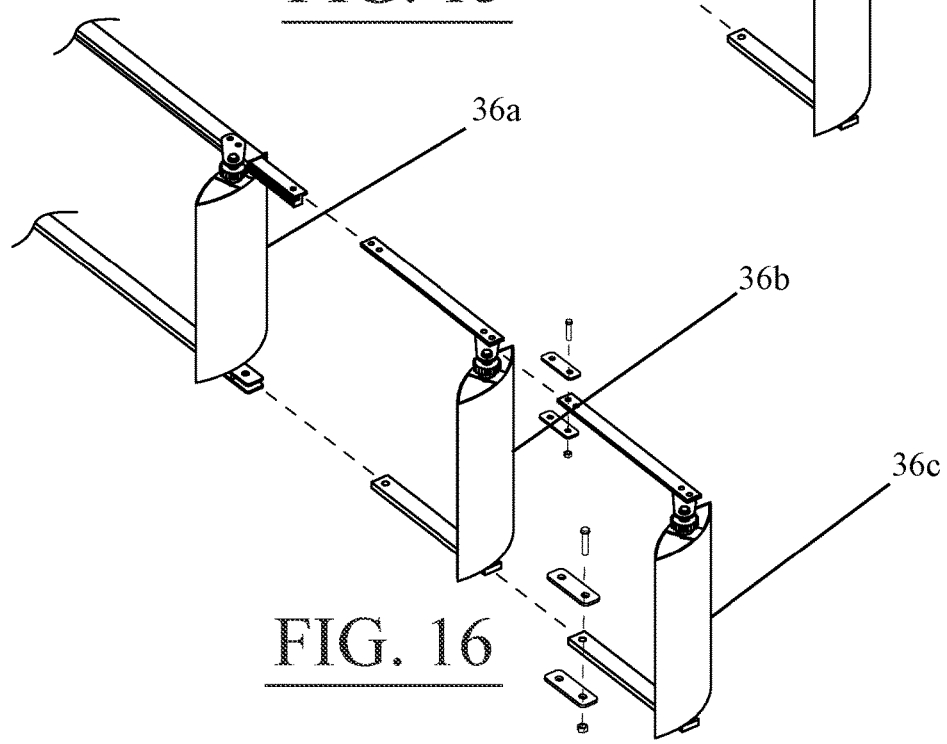
FIG. 16 is a perspective view of a third version of an arm assembly and blade having multiple tiers of blades.
Figure 17:
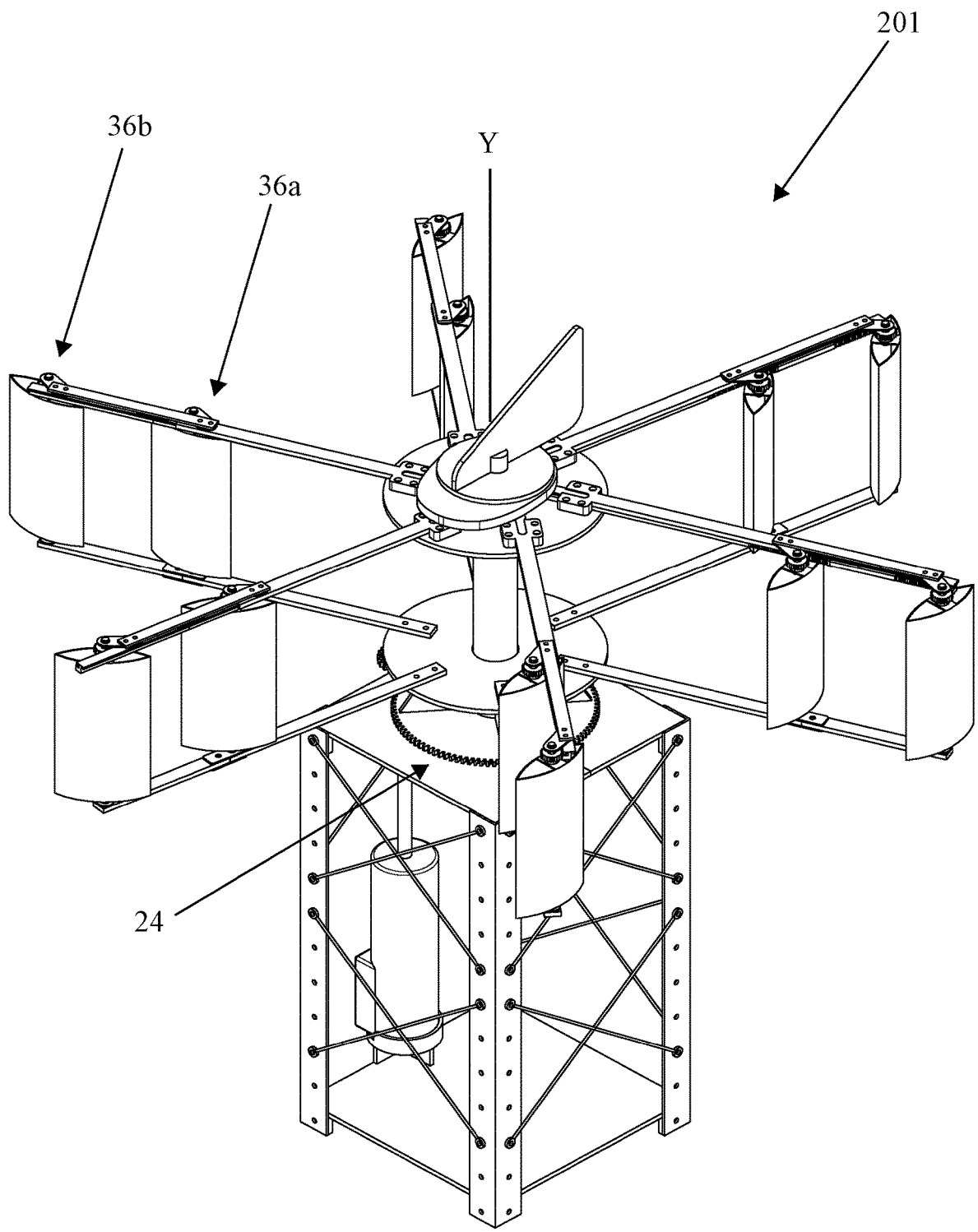
FIG. 17 is a front perspective view of a fourth version of the vertical axis wind turbine showing multiple tiers of radially spaced blades.

Now referring specifically to FIG. 15-FIG. 17, a version of the vertical wind turbine 200 may bolster several tiers of radial blade groupings. For example, FIG. 17 shows the turbine 200 having a first tier plurality of blades 36a and an outer second tier plurality of blades 36b. Providing multiple tier blade groups provides an option to increase the rotational force or thrust about the central axis Y. FIG. 16 partially illustrates how a third tier plurality of blades 36c may be added.

Preferably, the construction of the vertical wind turbine 10 is formed by a combination of materials—namely, carbon fiber, plastics, metals and lightweight, yet strong materials. Preferably, the blades 36 are manufactured of either Stainless Steel, Aluminum, and/or Tungsten.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings, may be replaced by alternative features serving the same, equivalent, or similar purpose unless expressly stated otherwise.

What is claimed is:

1. A vertical axis wind turbine comprising:
   a central axis that extends in a vertical direction;
   a support framework;
   a fixed central spindle having a distal end and supported by the support framework;
   a rotor assembly comprising:
     a hub assembly disposed about the central axis;
     a plurality of blades disposed about the central axis, the plurality of blades coupled to rotate together about the central axis, each blade having a blade axis about which it rotates; and
     a plurality of radially spaced arm assemblies connecting the plurality of blades to the hub assembly;
   an angle adjustment mechanism that is configured to adjust an angle formed between a blade and a radius that extends from the central axis to the blade as the blade rotates about the central axis and as relative wind velocity and direction changes, the angle adjustment mechanism comprising:
- a wind vane assembly adaptable to rotate about the central axis, the wind vane assembly comprising:
  - a cylindrical base plate having a central aperture for receiving the distal end of the fixed central spindle;
  - a horizontal support beam having a forward end and an aft end;
  - a balance counterweight supported by the forward end of the horizontal support beam;
  - a vertical stabilizer supported by the aft end of the horizontal support beam;
  - a rudder positioned aft of and hinged to the vertical stabilizer;
- a cam having a contoured perimeter affixed below the cylindrical base plate and disposed about the central axis, wherein the cam rotates in conjunction with the wind vane in relation to the direction of the wind, the cam having an interior track operably disposed about the contoured perimeter thereof;
- a cam bearing operably providing rotation of the wind vane and cam relative to the fixed central spindle;
- a pushrod operably connecting the blade angle with the cam having a proximal end and a distal end; and
- a track follower operably positioned at the proximal end of each pushrod and operably coupled to follow the interior track throughout a rotational path of the rotor assembly; and
- a brake release assembly comprising:
  - a linear rod translatable within a longitudinal path between a brake engaged position and a brake released position having a proximal end and a distal end, the distal end terminating at a plate providing a flat contact surface that is perpendicular to the longitudinal path, the proximal end terminating at a junction member;
  - a concentric band adapted to radially clutch the fixed central spindle while in the brake engaged position, the concentric band terminating at opposing first and second ends, opposing first and second ends forming a gap therebetween;
  - a first and second lever assemblies rotatable about opposing fixed first and second axis points at opposing sides of the central aperture affixed with the cylindrical base plate, each lever assembly comprising:
    - a primary rotatable member rotatable about the fixed axis point having a first and second arms extending outward at an angle, each arm terminating at a first and second hinge points;
    - a drive member having a length, a first end, and a second end, the first end operably hinged with the first arm of the primary rotatable member, and the second end operably hinged with the junction member;
    - a tension member having a length less than the drive member, a first end, and a second end, the first end operably hinged with the second arm of the primary rotatable member, and the second end operably hinged with one the respective first and second ends of the concentric band;
  - a spring operably connecting between the junction member and the cylindrical base plate for biasing the brake release assembly in the brake engaged position;
  - a brake release member fixedly attached to the rudder extending laterally, thereby as the direction of the relative wind changes, the rudder rotates and the brake release member is rotated inward and pushes the linear rod inward, which actuates the first and second lever assemblies to cause the concentric band to release from the fixed central spindle;
- wherein each of the blades are responsive to rotation throughout a cyclical path of the rotor assembly to vary the blade angle of each blade with respect to the direction of the wind impinging on wind vane.

2. The vertical axis wind turbine of claim 1, further comprising a rotor bearing for supporting and providing rotation of the rotor assembly throughout its cyclical path of motion, the rotor bearing affixed below the rotor assembly and operably affixed to the support framework.

3. The vertical axis wind turbine of claim 2, wherein the rotor bearing comprises an outer race, inner race, a cage retainer, and a plurality of balls, wherein the outer race is operably affixed to the support framework and the inner race is operably affixed to the rotor assembly.

4. The vertical axis wind turbine of claim 3, wherein the rotor bearing is an angular bearing.

5. The vertical axis wind turbine of claim 1, wherein the cam bearing comprises an outer race, inner race, a cage retainer, and a plurality of balls, wherein the outer race is operably affixed to the distal end of the central spindle and the inner race is operably affixed to the cam and wind vane.

6. The vertical axis wind turbine of claim 1, wherein the cam bearing is an angular bearing.

7. The vertical axis wind turbine of claim 1, further comprising a battery operably coupled with an electric generator for storing electrical energy.

8. The vertical axis wind turbine of claim 1, further comprising an electrical grid operably coupled with an electric generator for transferring electrical energy from the electric generator.

9. The vertical axis wind turbine of claim 1, further comprising an electric generator having a drive shaft; and a drive gear operably affixed to the rotor assembly rotatable about the central axis and operably configured to provide rotational force to the drive shaft of the electric generator.

10. The vertical axis wind turbine of claim 1, wherein the rotor assembly comprises a first tier plurality of blades and a second tier of plurality of blades disposed radially about the central axis and operably positioned in line with the respective first tier plurality of blades.

11. The vertical axis wind turbine of claim 1, further comprising a forward guide roller and a rear guide roller, wherein the forward guide roller and the rear guide roller are coupled together to provide the longitudinal path of the linear rod between the brake engaged position and a brake released position.

12. The vertical axis wind turbine of claim 1, further comprising a pivot connection operably connecting the distal end of the pushrod and operation of the blade angle, the pivot connection having a rack and pinion configuration.

13. A vertical axis wind turbine comprising:
- a central axis that extends in a vertical direction;
- a support framework;
- a fixed central spindle having a distal end and supported by the support framework;
- an electric generator having a drive shaft;

a rotor assembly comprising:
- a hub assembly disposed about the central axis;
- a plurality of blades disposed about the central axis, the plurality of blades are coupled to rotate together about the central axis, each blade having a blade axis about which it rotates; and
- a plurality of spaced apart arm assemblies connecting the plurality of blades to the hub assembly;

a rotor bearing for supporting and providing rotation of the rotor assembly throughout a rotational path of motion, the rotor bearing operably affixed below the rotor assembly and operably attached to the support framework, the rotor bearing having an outer race, inner race, a cage retainer, and a plurality of balls, wherein the outer race is operably affixed to the support framework and the inner race is operably affixed to the rotor assembly;

a drive gear operably affixed to the rotor assembly rotatable about the central axis and configured to provide rotational force to the drive shaft of the electric generator; and an angle adjustment mechanism that is configured to adjust an angle formed between a blade and a radius that extends from the central axis to the blade as the blade rotates about the central axis and as relative wind velocity and direction changes, the angle adjustment mechanism comprises:
- a wind vane assembly adaptable to rotate freely about the central axis so as to be aligned with the direction of the wind, the wind vane assembly comprising:
  - a cylindrical base plate having a central aperture for receiving the distal end of the fixed central spindle;
  - a horizontal support beam having a forward end and an aft end;
  - a balance counterweight supported by the forward end of the horizontal support beam;
  - a vertical stabilizer supported by the aft end of the horizontal support beam;
  - a rudder positioned aft of and hinged to the vertical stabilizer;
- a cam having a contoured perimeter affixed below the cylindrical base plate and disposed about the central axis, wherein the cam rotates in conjunction with the wind vane in relation to the direction of the wind, the cam having an interior track operably disposed about the contoured perimeter thereof;
- a cam bearing operably providing rotation of the wind vane and cam relative to the fixed central spindle, the bearing having an outer race, inner race, cage retainer, plurality of balls, and lubrication, wherein the outer race is operably affixed to the distal end of the central spindle and the inner race is operably affixed to the cam and wind vane;
- a pushrod operably connecting the blade angle with the cam having a proximal end and a distal end;
- a track follower operably positioned at the proximal end of each pushrod and operably coupled to follow the interior track throughout a rotational path of the rotor assembly; and
- a pivot connection operably connecting the distal end of the pushrod and operation of the blade angle, the pivot connection having a rack and pinion type configuration;

a wind vane brake release assembly comprising:
- a linear rod translatable within a longitudinal path between a brake engaged position and a brake released position having a proximal end and a distal end, the distal end terminating at a plate providing a flat contact surface that is perpendicular to the longitudinal path, the proximal end terminating at a junction assembly;
- a concentric band adapted to radially clutch the fixed central spindle while in the brake engaged position, the concentric band terminating at opposing first and second ends, opposing first and second ends forming a gap therebetween;
- a first and second lever assemblies rotatable about opposing fixed first and second hinged axis points at opposing sides of the central aperture affixed with the cylindrical base plate, each lever assembly comprising:
  - a primary rotatable member rotatable about the fixed axis point having a first and second arms extending outward at an angle, each arm terminating at a first and second hinge points;
  - a drive member having a length, a first end, and a second end, the first end operably hinged with the first arm of the primary rotatable member, and the second end operably hinged with the junction assembly;
  - a tension member having a length less than the drive member, a first end, and a second end, the first end operably hinged with the second arm of the primary rotatable member, and the second end operably hinged with one the respective first and second ends of the concentric band;
- a spring operably connecting between the junction assembly and the cylindrical base plate for biasing the wind vane brake release assembly in the brake engaged position;
- a brake release member fixedly attached to the rudder extending laterally, thereby as the direction of the relative wind changes, the rudder rotates and the brake release member is rotated inward and pushes the linear rod inward which actuates the first and second lever assemblies to cause the concentric band to release from the fixed central spindle;

wherein each of the blades is responsive to rotation throughout a cyclical path of the rotor assembly to vary the blade angle of each blade with respect to the direction of the wind impinging on the wind vane.

14. The vertical axis wind turbine of claim 13, further comprising a forward guide roller and a rear guide roller, wherein the forward guide roller and the rear guide roller are coupled together to provide the longitudinal path of the linear rod between a brake engaged position and a brake disengaged position.

15. The vertical axis wind turbine of claim 14, wherein the rotor assembly comprises a first tier plurality of blades and a second tier of plurality of blades disposed radially about the central axis and operably positioned in line with the respective first tier plurality of blades.

16. The vertical axis wind turbine of claim 13, further comprising a battery operably coupled with an electric generator for storing electrical energy.

17. The vertical axis wind turbine of claim 13, further comprising an electrical grid operably coupled with an electric generator for transferring electrical energy from the electric generator.

* * * * *